United States Patent [19]

Sarovich

[11] 4,225,034
[45] Sep. 30, 1980

[54] CONTAINER CONVEYING AND ELEVATING APPARATUS

[75] Inventor: Steve Sarovich, Oak Brook, Ill.

[73] Assignee: The Sardee Corporation, Alsip, Ill.

[21] Appl. No.: 921,812

[22] Filed: Jul. 3, 1978

[51] Int. Cl.² .......................................... B65G 15/24
[52] U.S. Cl. .................... 198/607; 198/698; 198/728; 198/836; 198/861
[58] Field of Search ............... 198/604, 606, 607, 626, 198/688, 698, 699, 728, 731, 841, 651, 801, 725, 735, 425, 637, 496–499, 860, 861, 445, 398, 836

[56] References Cited

U.S. PATENT DOCUMENTS

| 675,703 | 6/1901 | Allen | 198/699 |
|---|---|---|---|
| 2,464,530 | 3/1949 | Reimers | 198/836 |
| 2,668,613 | 2/1954 | Ashlock | 198/637 |
| 3,603,450 | 9/1971 | Chamberlain et al. | 198/688 |
| 3,924,732 | 12/1975 | Leonard | 198/398 |
| 4,036,355 | 7/1977 | Valli | 198/688 |
| 4,056,185 | 11/1977 | Cartwright | 198/861 |

FOREIGN PATENT DOCUMENTS

| 2149178 | 4/1972 | Fed. Rep. of Germany | 198/607 |
|---|---|---|---|
| 685013 | 3/1965 | Italy | 198/699 |
| 641872 | 8/1950 | United Kingdom | 198/626 |

Primary Examiner—Joseph E. Valenza
Attorney, Agent, or Firm—Charles B. Cannon; Charles B. Cannon

[57] ABSTRACT

A container conveying and elevating apparatus conveys relatively shallow containers having a relatively large diameter, such as aluminum can cup bodies, in banks, or en masse, that is, in multiple rows, along a generally horizontal feed-in conveyor to the front or imput side of a vertically extending elevator housing and onto the bottom run of a generally vertically extending elevator conveyor which is arranged in the housing. The elevator conveyor embodies multiple rows of generally horizontally or longitudinally and transversely extending spaced flexible container-conveying and supporting finger members which are adapted to project into the interiors of, or otherwise engage, the containers as they are fed by the feed-in conveyor to the bottom horizontal run of the elevator conveyor. The containers are then conveyed by the bottom run of the elevator conveyor, and the flexible finger members thereon, around the first and lower turn-around of the elevator conveyor, during which they are turned through an arc of approximately ninety degrees (90°) from a vertical position into a horizontal position on the vertically extending rear run of the elevator conveyor. The containers are then conveyed upwardly on the rear run of the elevator conveyor into the upper area of the elevator housing where they are again turned through an arc of approximately ninety degrees (90°) from a horizontal position into an upright or vertical position, when they are delivered, en masse, in upright position, from the rear run of the elevator conveyor to a take-away or delivery conveyor by which they are conveyed to work station for extrusion of the can cup bodies or for other operations on the containers or container bodies.

15 Claims, 31 Drawing Figures

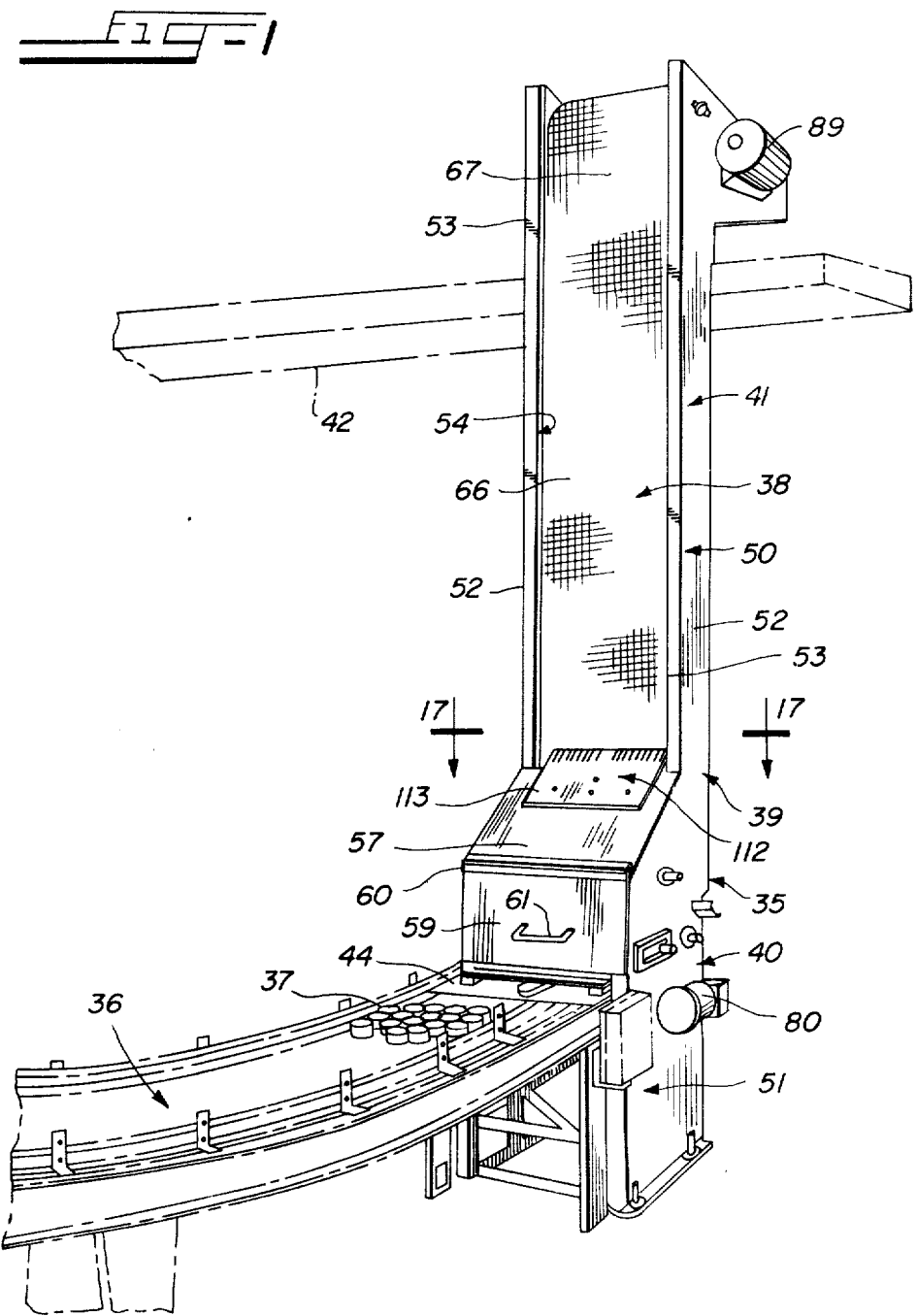

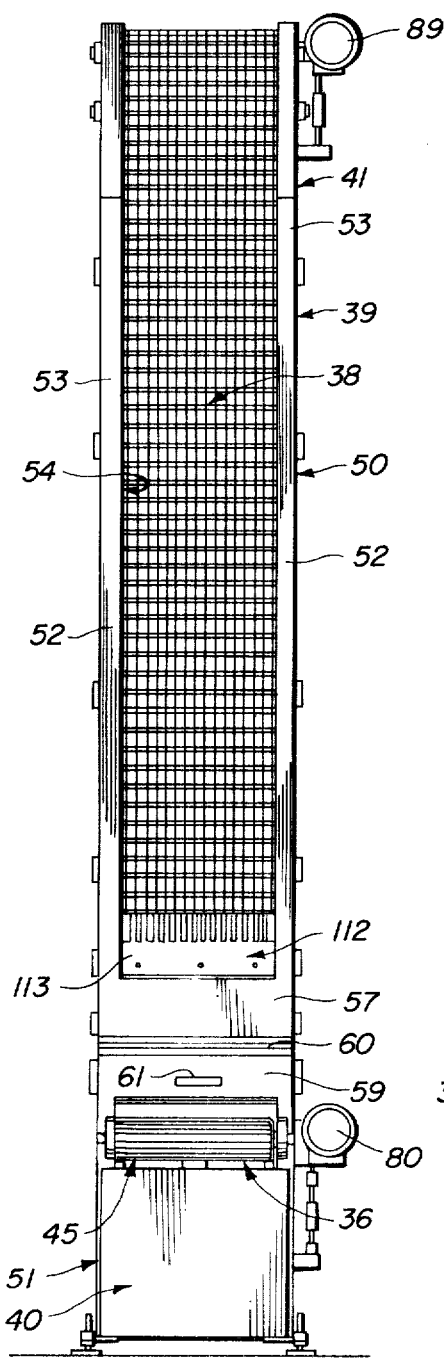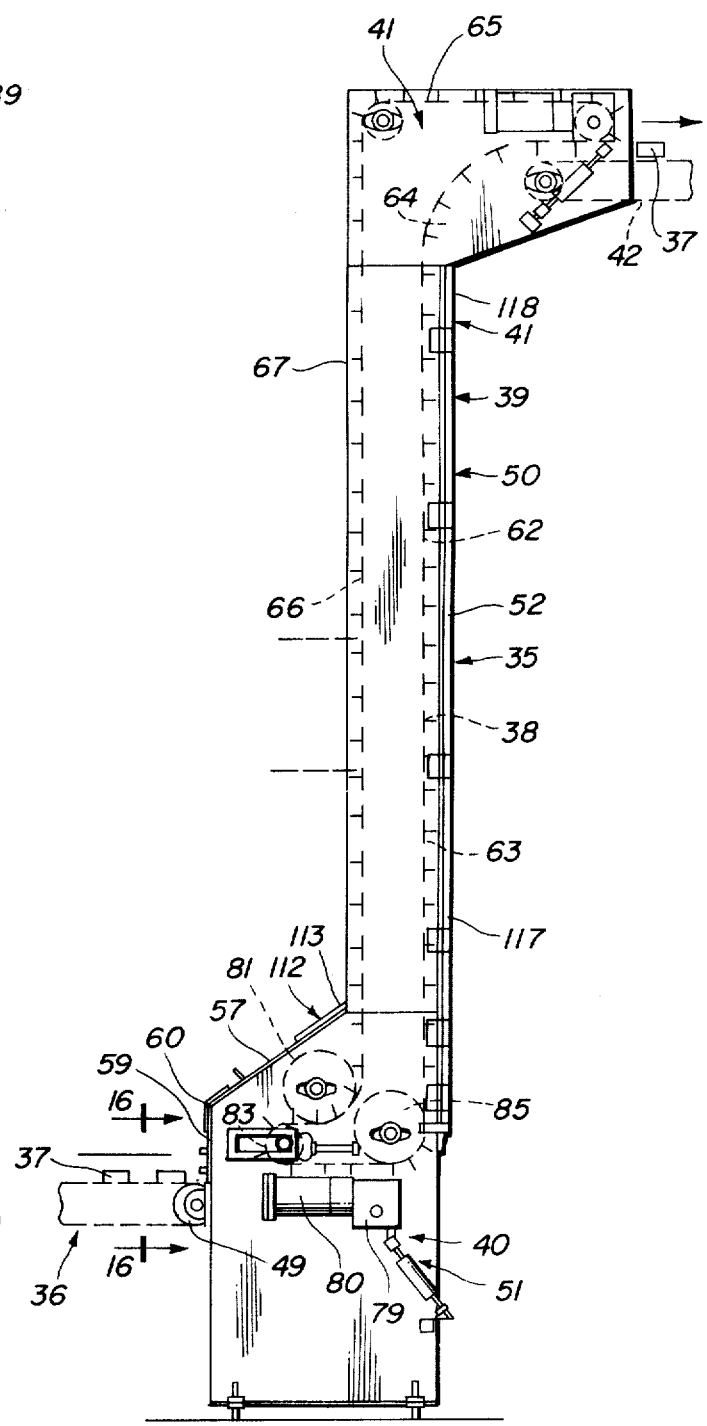

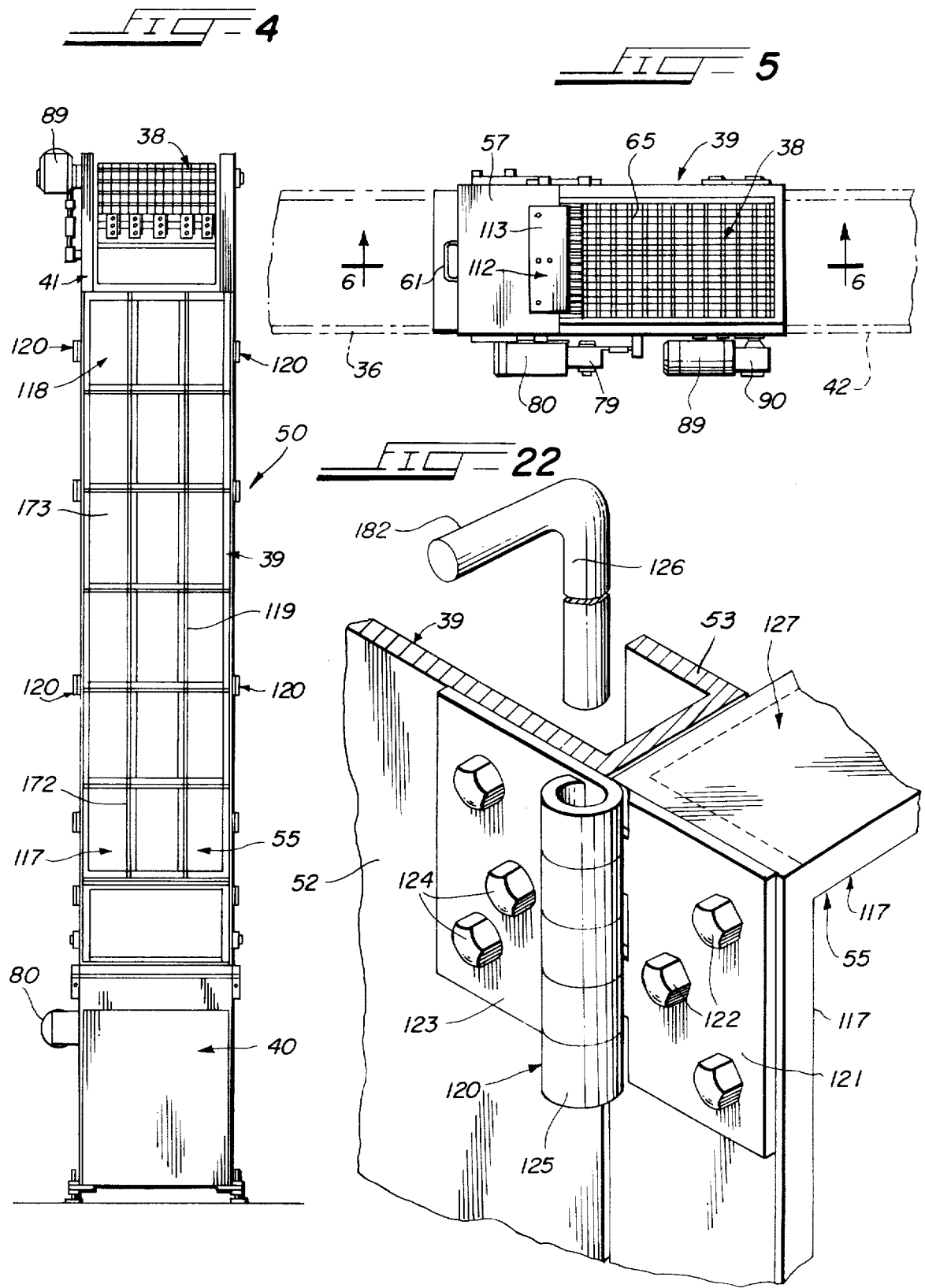

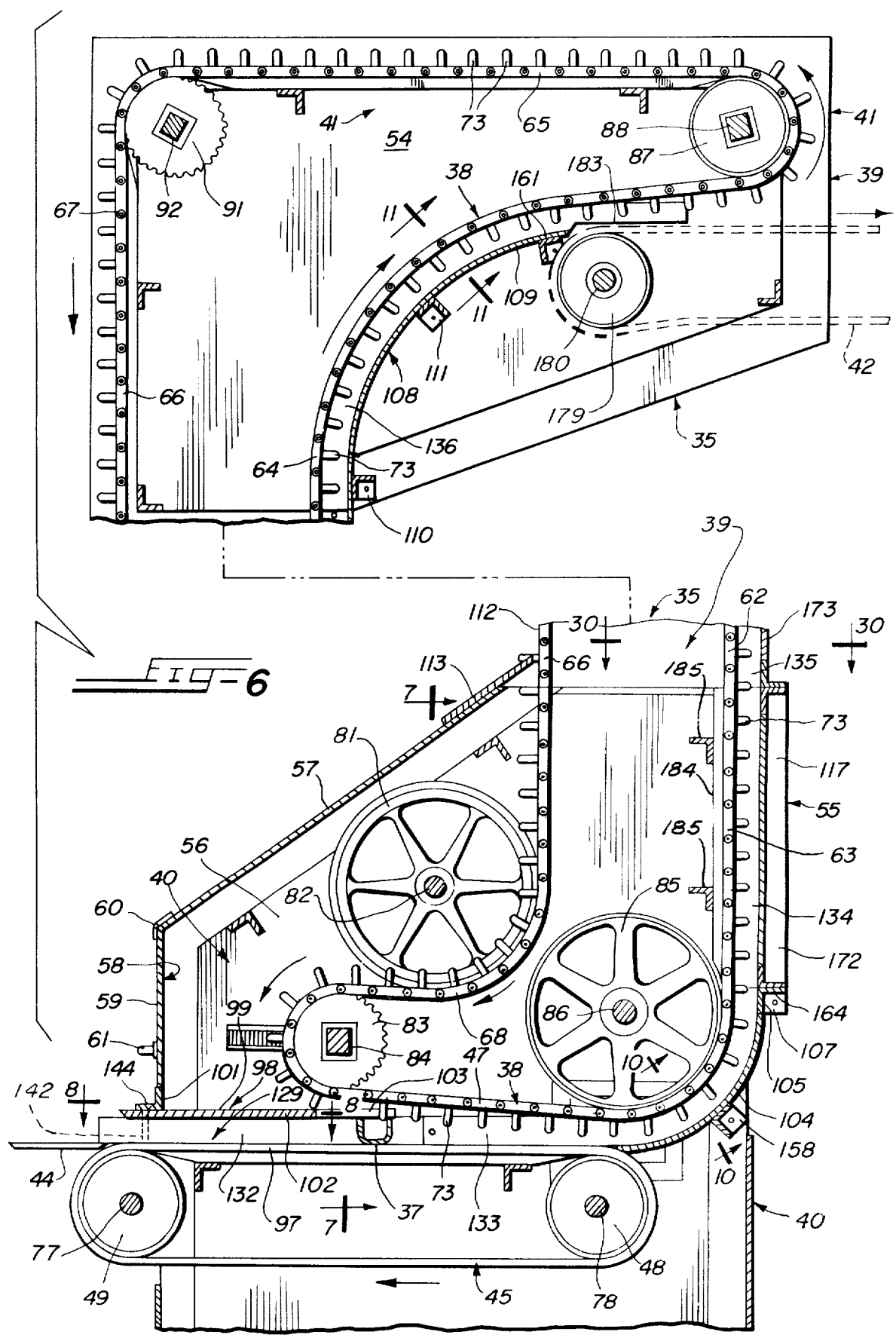

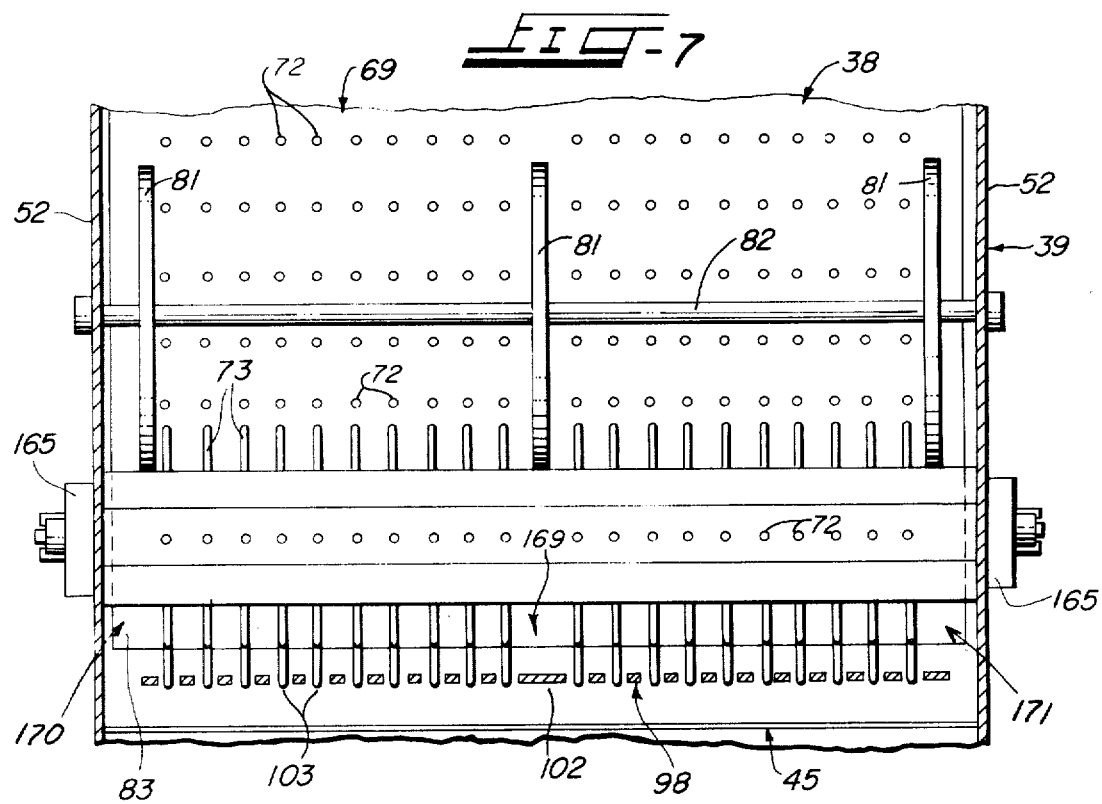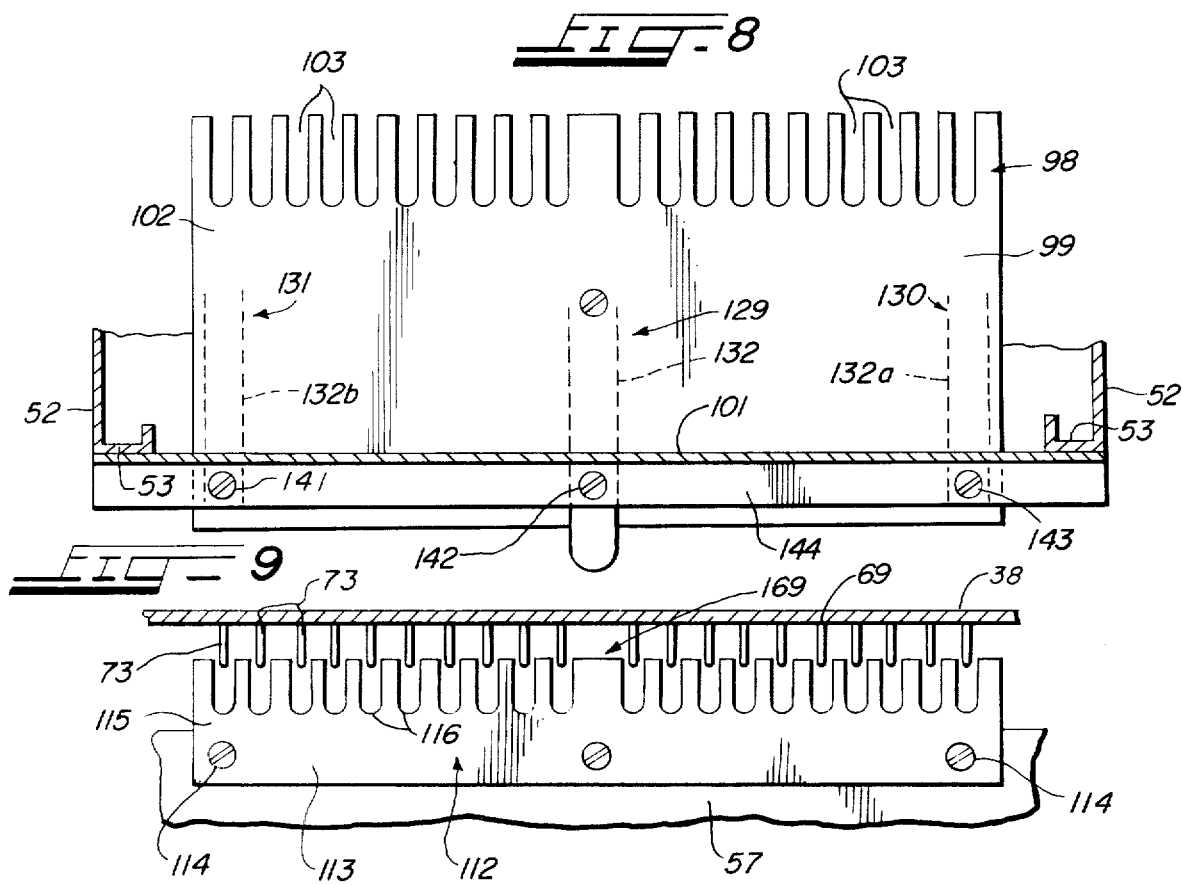

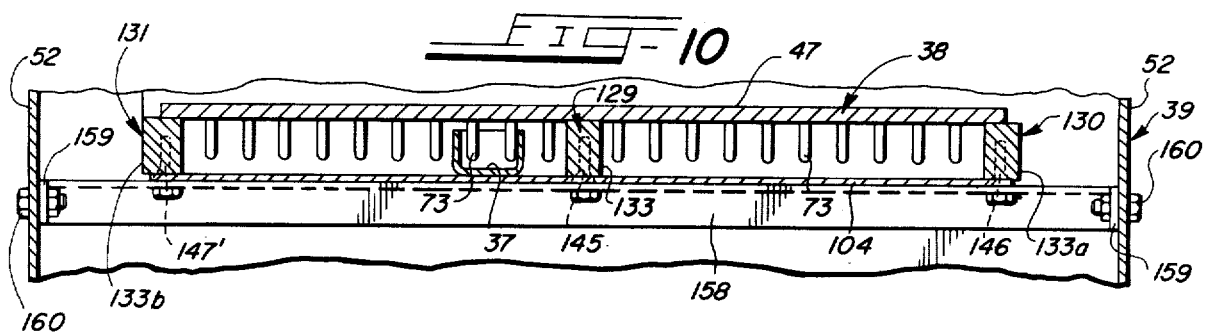
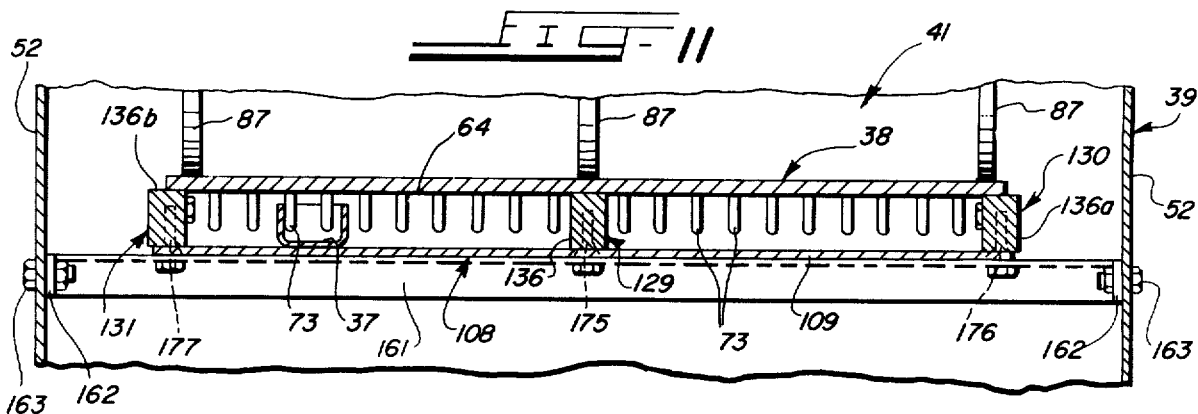
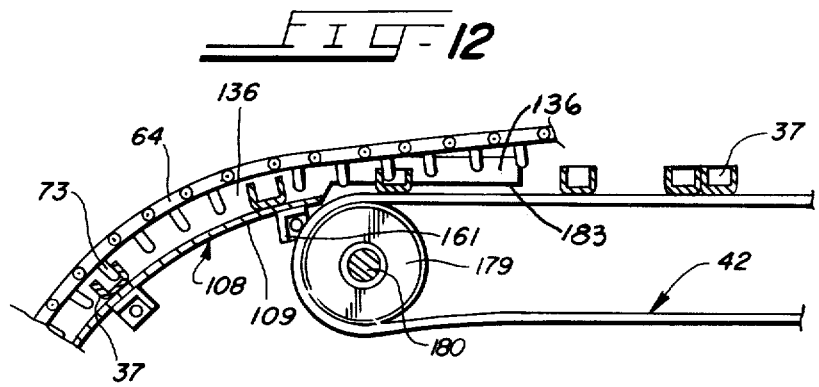
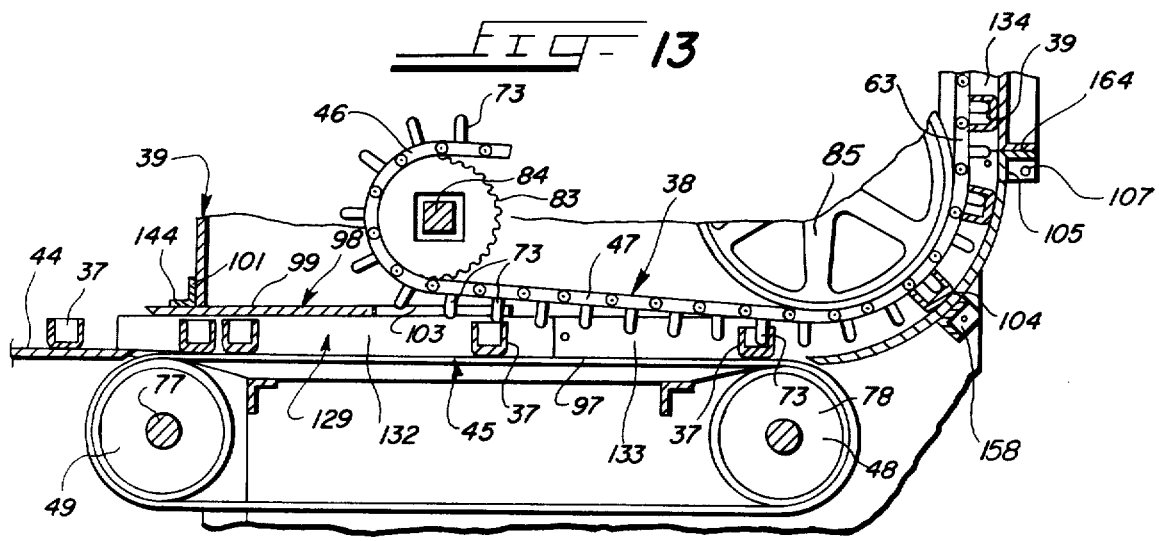

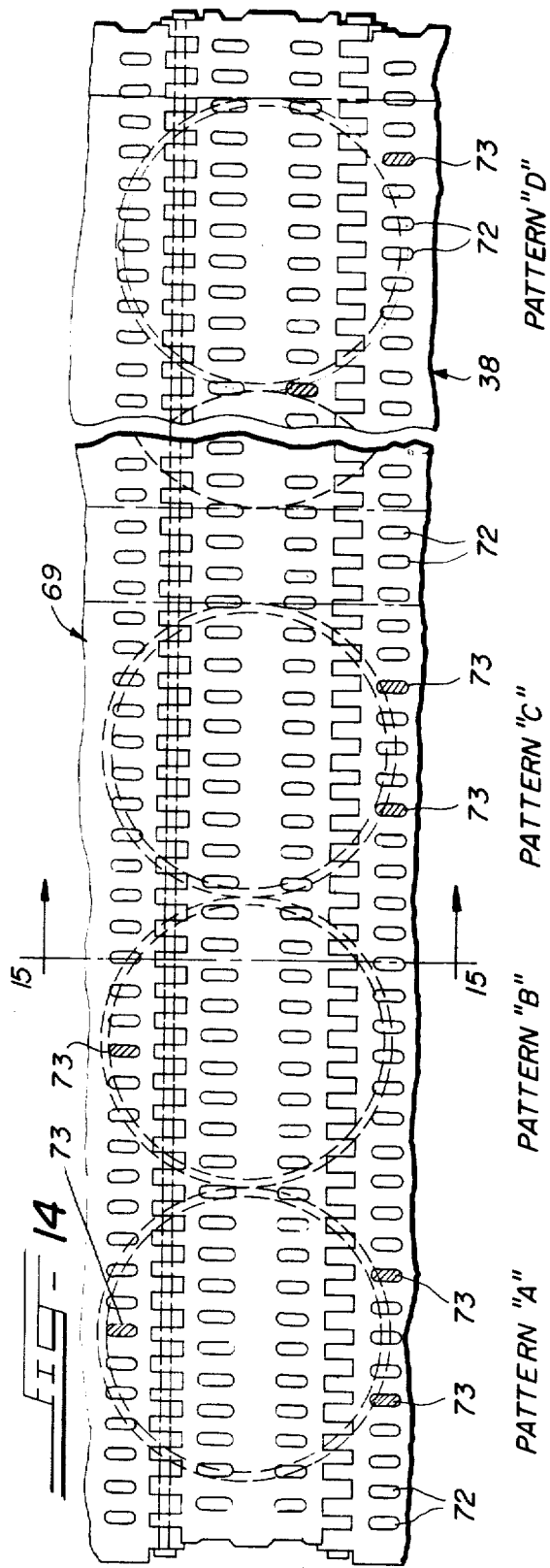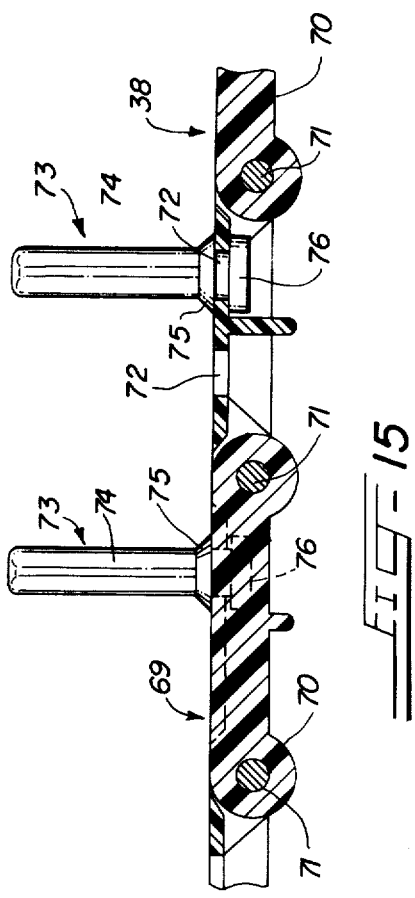

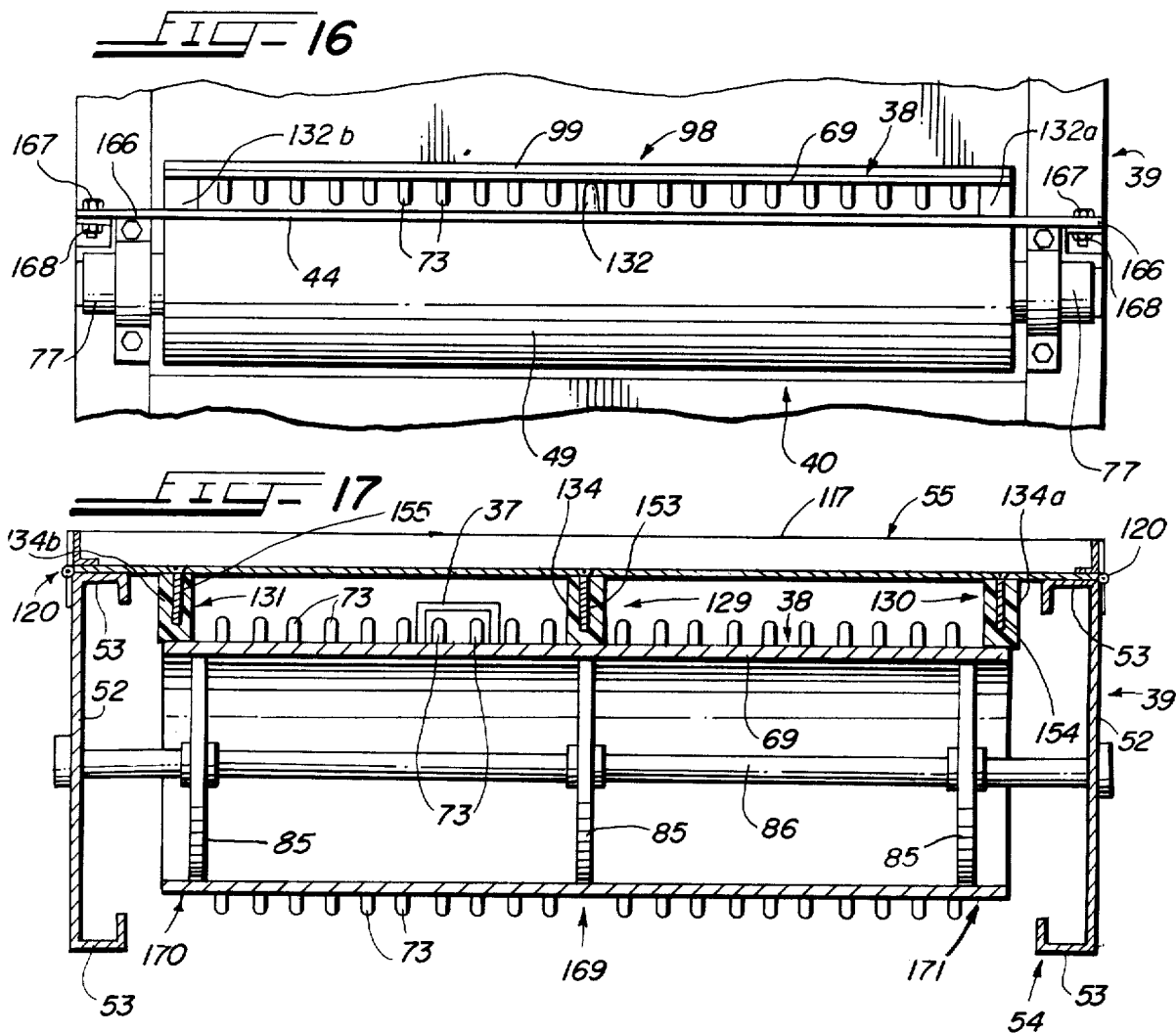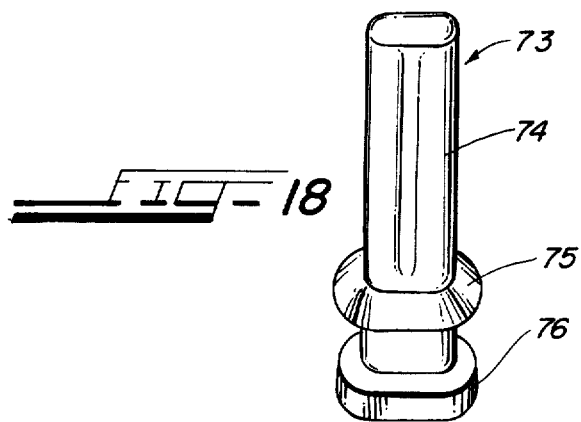

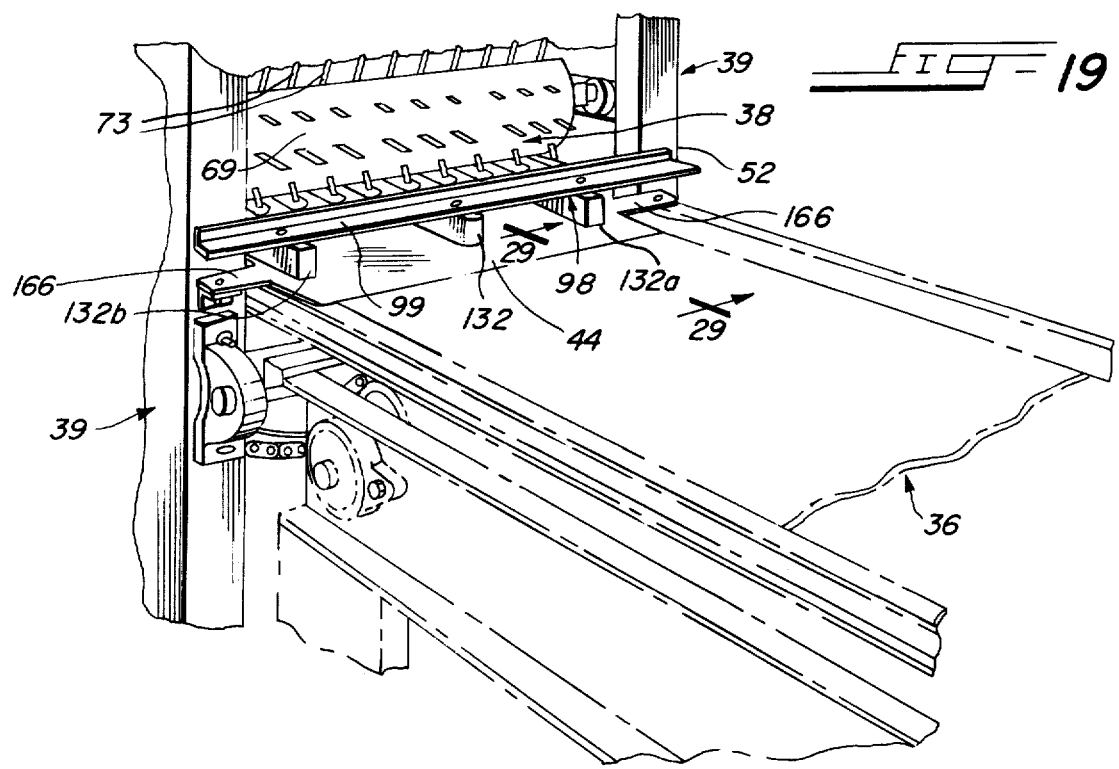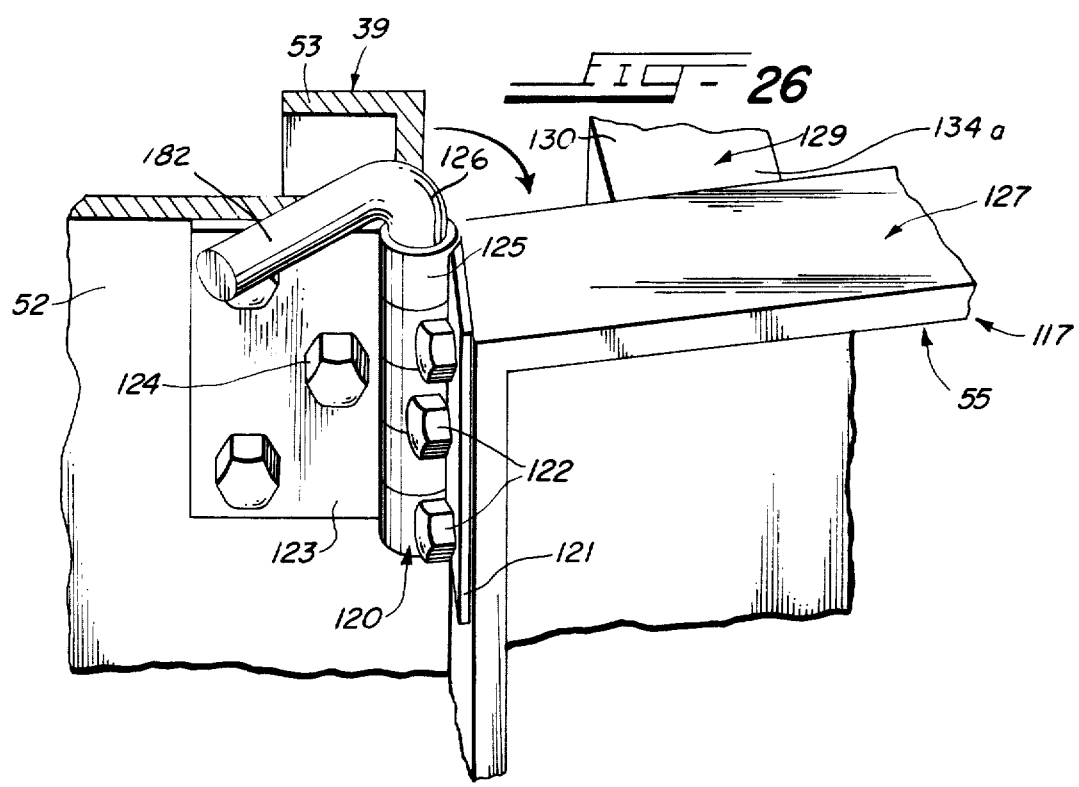

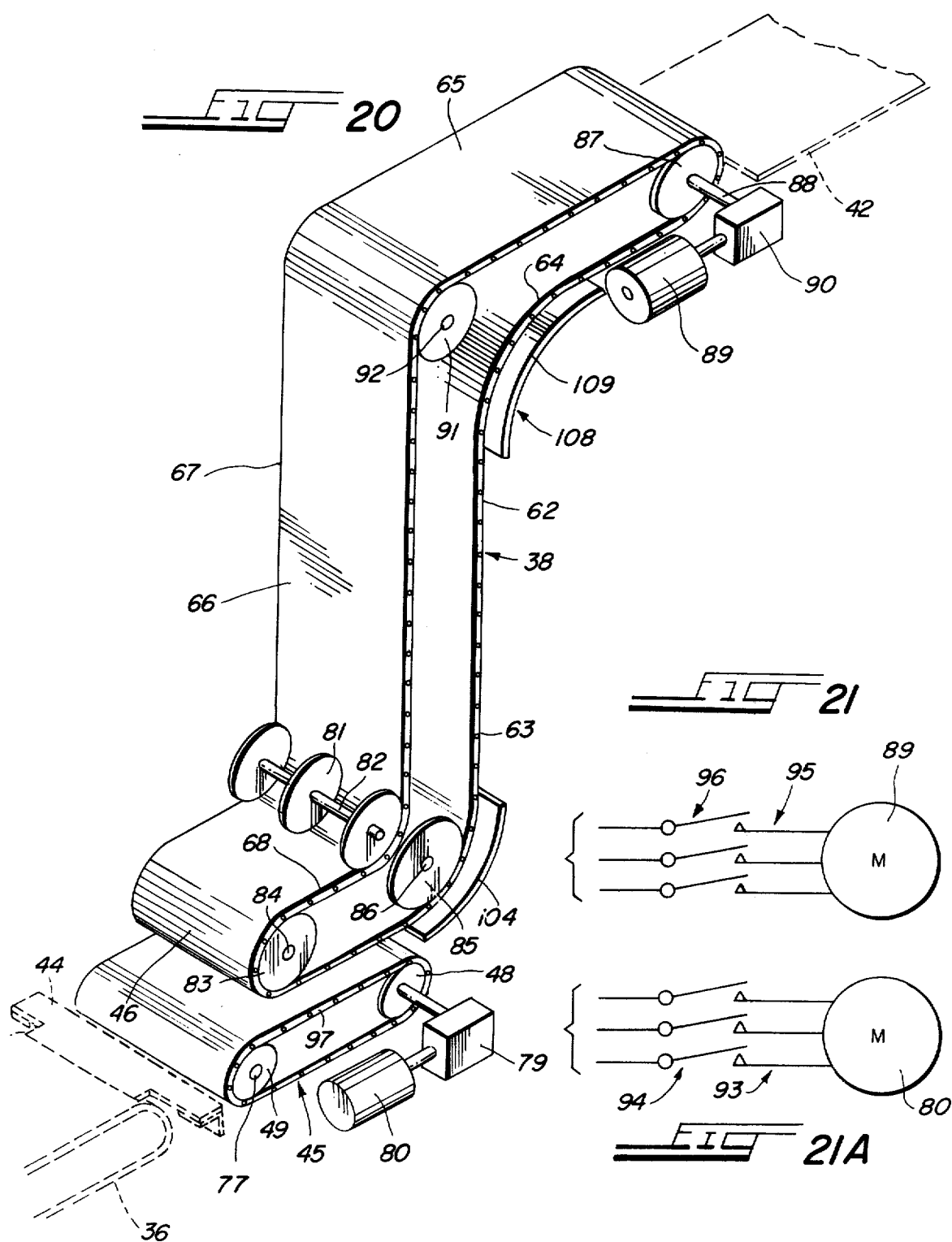

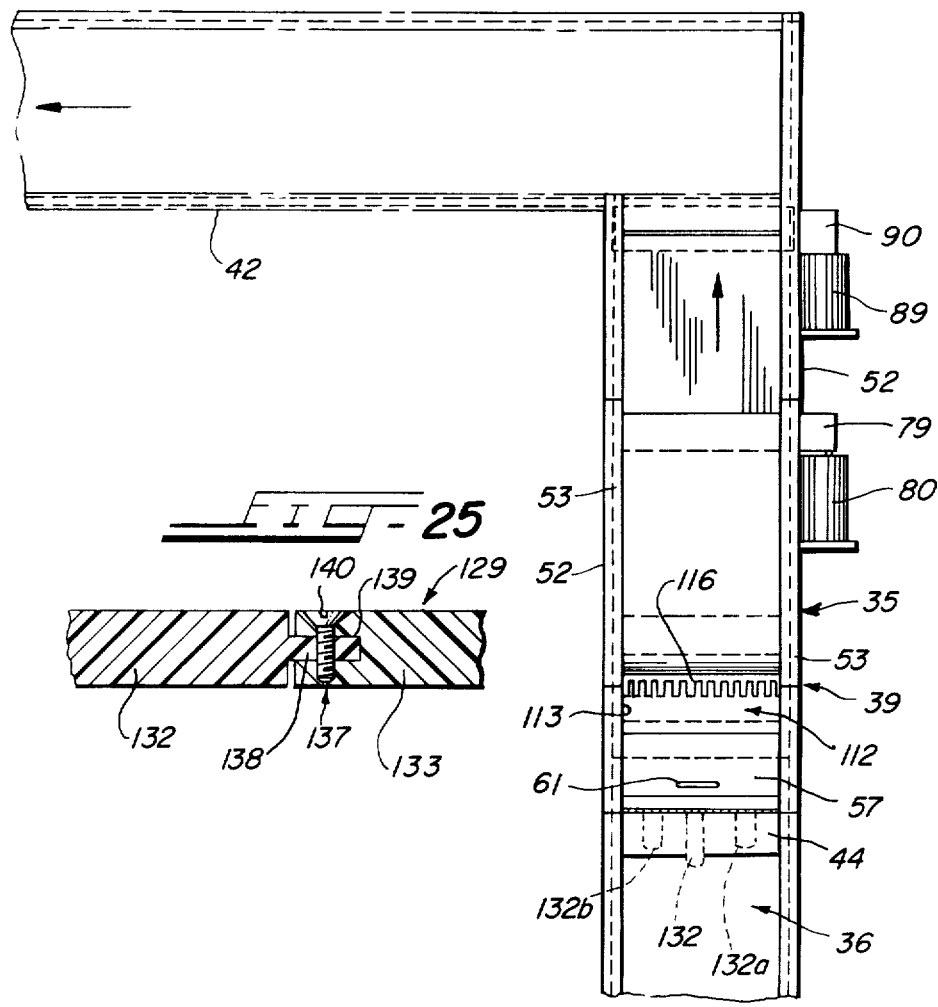
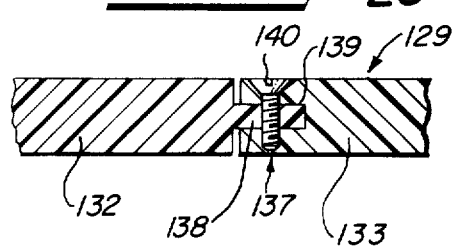
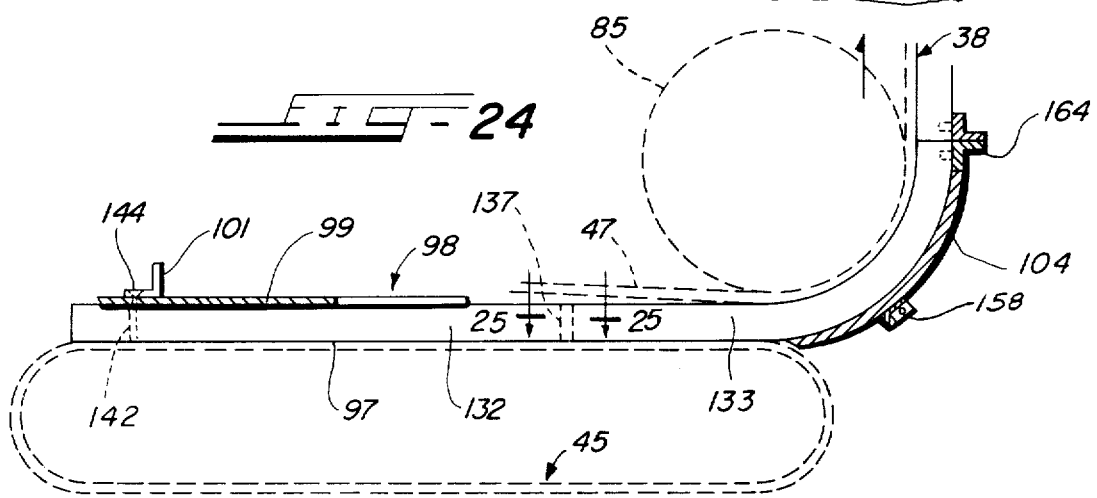

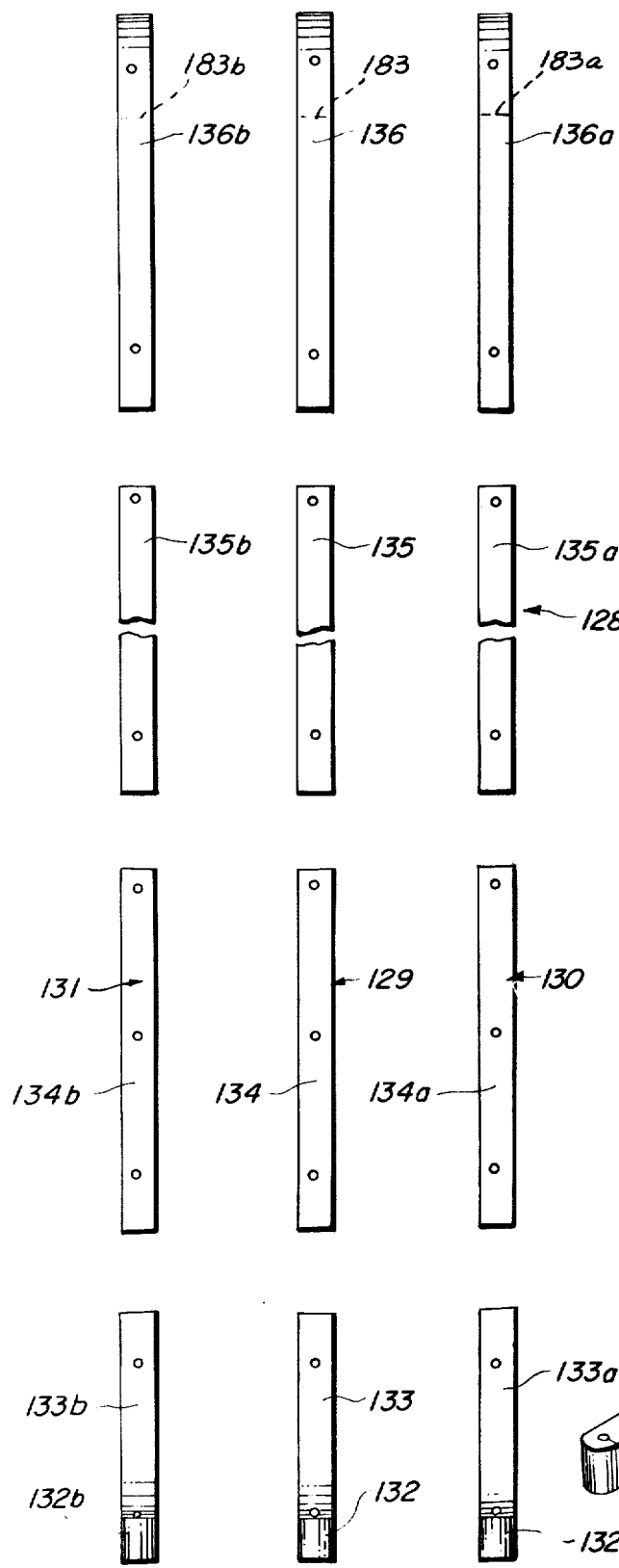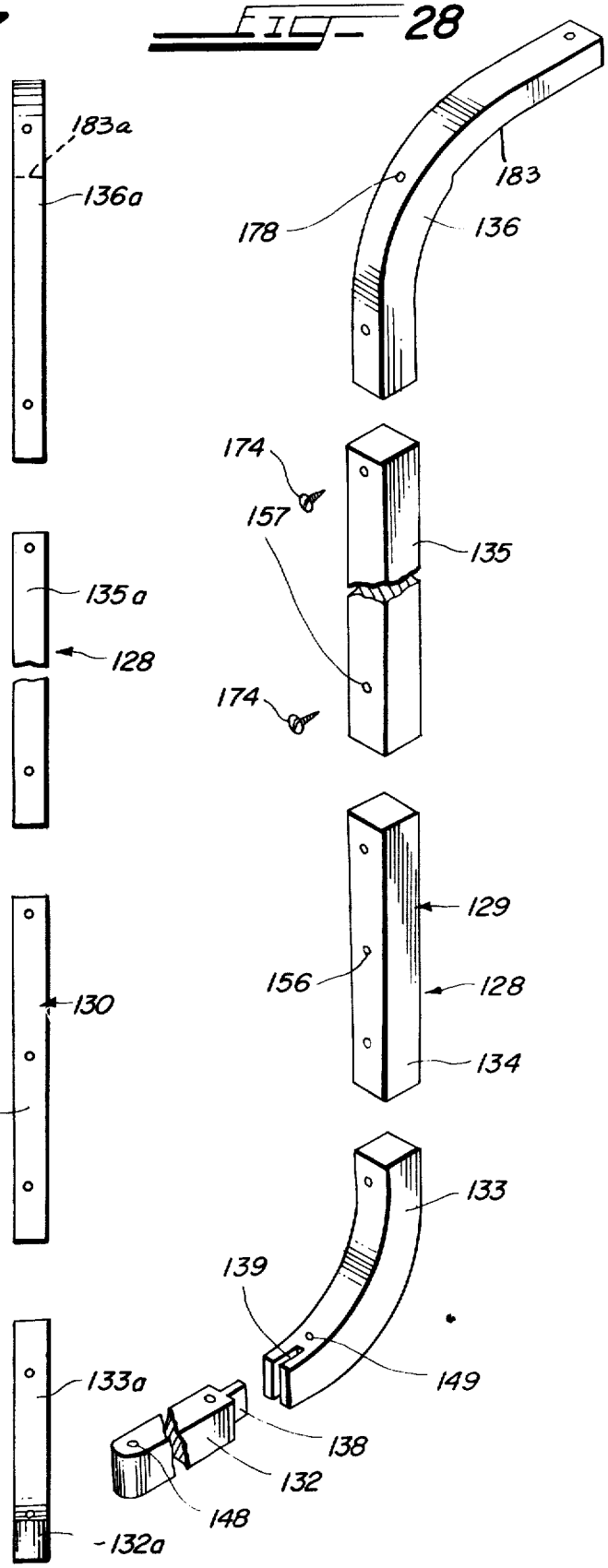

CONTAINER CONVEYING AND ELEVATING APPARATUS

BACKGROUND OF THE INVENTION

Heretofore in the art various forms of container-conveying and elevating apparatus have been used by manufacturers of aluminum and other metal cans for use in the food canning and other canning industries, and it has been customary in such prior art apparatus to convey the containers, such as can cup bodies, in a single row or file along a generally horizontal feed-in conveyor and thence to elevate them in a single file or row up an inclined elevating conveyor to a take-away or delivery conveyor by which the can cup bodies or other containers are delivered to a work station were the can cup bodies are extruded or other operations are performed on the containers or container bodies. However, such prior container-conveying and elevating apparatus have been subject to a number of objectionable features including the fact that they have been slow and uneconomical in operation; the containers, such as can cup bodies, have been subjected to dents, scratches, and the like, or so-called "dings", as a result of being bumped against each other, or otherwise damaged, during the conveying and elevating operation; and they have been noisy in operation due to the bumping and jamming of the containers, such as can cup bodies.

OBJECTS OF THE INVENTION

An object of the invention is to provide a new and improved and more efficient and economical container-conveying and elevating apparatus than has existed heretofore for conveying containers or container bodies, such as aluminum or other metal can cup bodies, in banks or en masse, that is, multiple rows, and in upright position, from a generally horizontal feed-in conveyor to a generally vertically extending elevator conveyor and delivering them, en masse, or in banks, that is, in multiple rows, and in upright position, to a take-away or delivery conveyor by which they are conveyed to a work station for completion of the can cup bodies or other operations on the containers or container bodies.

An additional object of the invention is to provide a new and improved can cup or other container-conveying and elevating apparatus which eliminates dents and scratches or so-called "dings", and like damage, to the can cup bodies or other containers during the conveying and elevating operation, and which is substantially noiseless in operation.

A further object of the invention is to provide a new and improved container-conveying and elevating apparatus which is particularly adapted for use in conveying and elevating containers or container bodies which are relatively shallow in depth but have a realatively wide diameter, including aluminum can cup bodies, as well as composite containers such, for example, as snuff containers, and the like.

Another object of the invention is to provide therein novel first and second turning means for turning the containers, such as can cup bodies or other containers, in banks or en masse, successively through two arcs of ninety degrees (90°) during the conveying and elevating operation, from the time the containers are fed by the feed-in conveyor means, in upright position, into the elevator housing, so that the can cup bodies or other containers are delivered to the vertical conveyor in the elevator housing in upright position and are discharged therefrom in upright position onto a take-away or delivery conveyor by which they are conveyed in upright position to a work station.

An addition object of the invention is to provide in the new container-conveying and elevating apparatus novel means for removing from the front and downward vertical run of the generally vertically extending elevator conveyor any errant or stray can cup bodies or other containers which have not been discharged from the vertically extending elevator conveyor onto the take-away or delivery conveyor, thus preventing such errant or stray can cup bodies or other containers from being carried downwardly on the front and vertical downward run of the vertically extending elevator conveyor and causing jamming or other damage to the elevator conveyor apparatus.

Another and more specific object of the invention is to provide therein novel means for turning the can cups or other containers through an arc of approximately ninety degrees (90°) from upright position into a horizontal position as they can removed from the feed-in conveyor by the flexible container-conveying and supporting finger members on the elevator conveyor and positioning them in horizontal position on the vertically extending rear run of the vertical elevator conveyor.

An additional and more specific object of the invention is to provide therein novel means for uprighting the can cups or other containers by turning them through an arc of approximately ninety degrees (90°) from a horizontal position into an upright position as they leave the upper portion of the vertically extending rear run of the elevator conveyor so that they are delivered in upright position onto the take-away or delivery conveyor by which they are conveyed to a work station for further operation thereon.

Still another object of the invention is to provide therein novel means for preventing tilting and jamming of the containers or container bodies as they are delivered from the first and outer feed-in conveyor to the second and inner feed-in conveyor and are picked up by the bottom run of the vertical conveyor as the flexible conveying and supporting finger members engage the can cups or other containers and remove them from the first and outer feed-in conveyor.

An additional object of the invention is to provide novel guiding and anti-friction wear strip means for guiding and supporting the endless conveyor during its cycle of movement in the elevator housing and for keeping the flexible finger members on the conveyor out of engagement with the adjacent surfaces of the apparatus over and adjacent to which the conveyor travels during its operation, and a novel arrangement for mounting such guiding and anti-friction wear strip means in position of use in the elevator housing.

A further object of the invention is to provide therein a novel elevator conveyor including novel flexible conveying and supporting finger members and a novel elevator conveyor body in which the flexible finger members may be mounted in preselected patterns depending upon the size and diameter of the containers or container bodies which are to be elevated by the elevator conveyor.

Other objects will appear hereinafter.

DESCRIPTION OF FIGURES IN THE DRAWINGS

FIG. 1 is a front perspective view of the new container-conveying and elevating apparatus showing parts of the first and outer feed-in conveyor as seen from the front thereof;

FIG. 2 is a partial front elevational view of the new container-conveying and elevating apparatus as seen from the front in FIG. 1;

FIG. 3 is a side elevational view of the new container-conveying and elevating apparatus as seen from the right hand side in FIG. 2;

FIG. 4 is a rear elevational view of the new container-conveying and elevating apparatus;

FIG. 5 is a top plan view of the new container-conveying and elevating apparatus;

FIG. 6 is an enlarged broken and staggered vertical sectional view on line 6—6 in FIG. 5;

Figure 29:
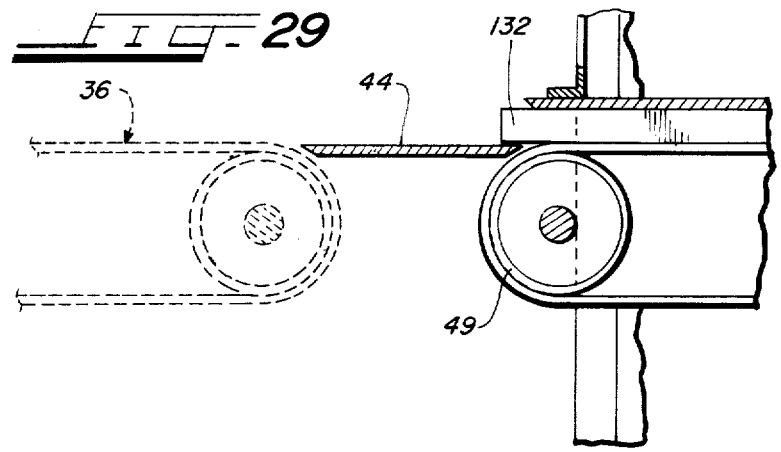
Figure 30:
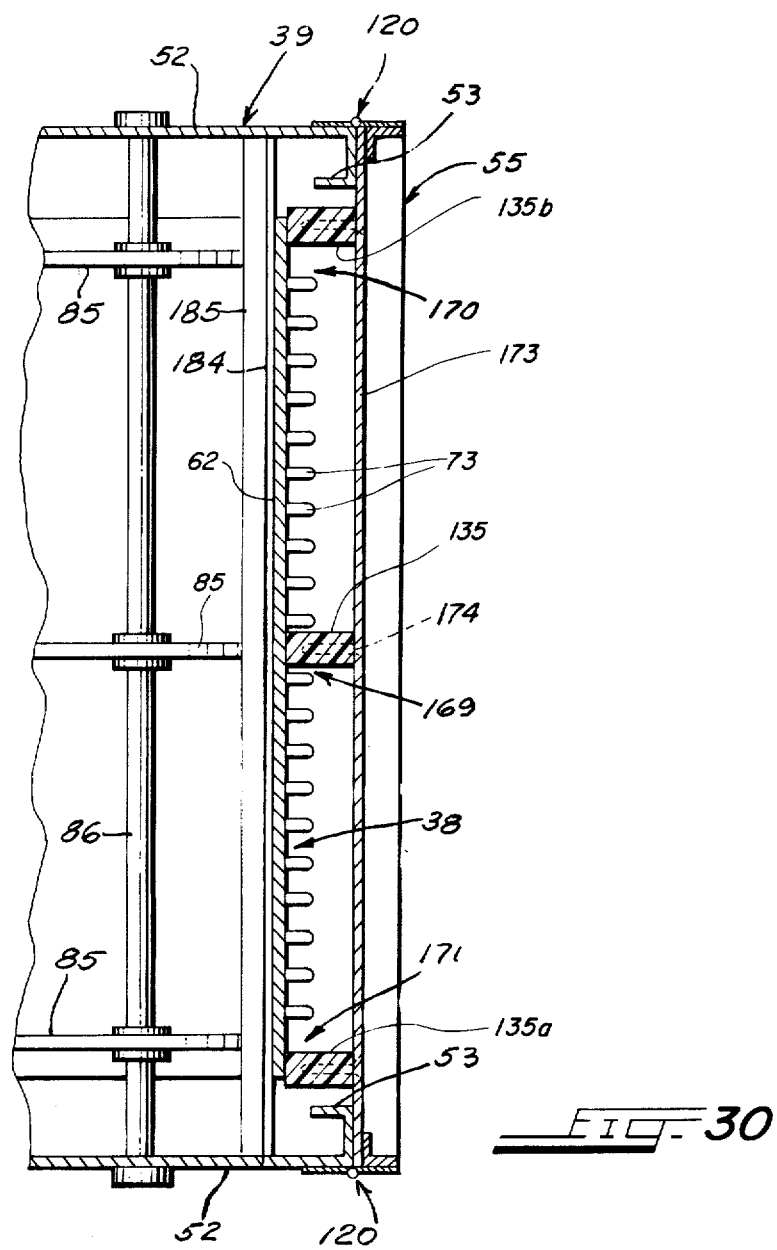

FIG. 7 is a broken view, partly in section and partly in elevation, on line 7—7 in FIG. 6, illustrating parts of the elevator conveyor and part of the means for preventing tilting and jamming of the containers or container bodies as they are fed from the first and outer feed-in conveyor and are delivered onto the second and inner feed-in conveyor and are picked up by the flexible conveying and supporting finger members on the bottom run of the vertical elevator conveyor;

FIG. 8 is a sectional plan view, on line 8—8 in FIG. 6, illustrating the means for preventing tilting and jamming of the containers or container bodies as they are fed by the first and outer feed-in conveyor onto the second and inner feed-in conveyor;

FIG. 9 is a sectional plan view, on line 9—9 in FIG. 6, illustrating the means for removing errant or stray containers or container bodies from the front and downward run of the vertical elevator conveyor in the event that one or more errant or stray containers are not discharged from the vertical elevator conveyor onto the horizontal delivery or take-away conveyor at the top of the vertical elevator conveyor and are carried down the front and downward run of the vertical elevator conveyor;

FIG. 10 is an enlarged sectional view, on line 10—10 in FIG. 6, illustrating the first and lower turning means for turning the containers or container bodies through an arc of approximately ninety degrees (90°) from the upright position in which they are removed from the second and inner feed-in conveyor means into the horizontal position in which the containers or container bodies are held as they are carried up the vertically extending rear run of the elevator conveyor;

FIG. 11 is an enlarged sectional view, on line 11—11 in FIG. 6, illustrating the second and upper turning means for turning the containers or container bodies through an arc of approximately ninety degrees (90°) from a horizontal position into an upright or vertical position as they leave the upper portion of the rear run of the vertical elevator conveyor and are discharged in upright position onto the take-away or delivery conveyor, and illustrating the conveyor guiding and anti-friction wear strip means for guiding the arcuate-shaped upper section of the rear run of the elevator conveyor during operation thereof;

FIG. 12 is a fragmentary sectional view, partly in side elevation, illustrating the second and upper turning means, and the conveyor guiding and anti-friction wear strip means, shown in FIG. 11;

FIG. 13 is a fragmentary sectional view, partly in elevation, showing parts of the apparatus illustrated in the lower part of FIG. 6, and illustrating the first and lower turning means by which the containers or container bodies are delivered in upright position from the second and inner feed-in conveyor and are picked up by the flexible container-conveying and supporting finger members on the bottom and horizontal run of the vertical elevator conveyor and are carried thereby and turned through an arc of approximately ninety degrees (90°) from an upright position into a generally horizontal position as they are carried up the vertical rear run of the elevator conveyor;

FIG. 14 is a frangmentary plan view, partly schematic, of the vertical elevator conveyor, and illustrating the arrangement of the flexible container-conveying and supporting finger members and the rows of mounting slots in which they are mounted in preselected patterns in the body of the vertical elevator conveyor, and illustrating various arrangements or patterns in which the flexible container-conveying and supporting finger members may engage and support the containers or container bodies during the conveying and elevating operation;

FIG. 15 is an enlarged fragmentary sectional view, on line 15—15 in FIG. 14, illustrating the construction of the vertical elevator conveyor and its articulated flights or sections, and the mounting of the flexible container-conveying and supporting finger members therein;

FIG. 16 is an enlarged fragmentary sectional view, partly in elevation, on line 16—16 in FIG. 3, illustrating parts of the inner feed-in conveyor and parts of the bottom run of the vertical elevator conveyor;

FIG. 17 is a transverse sectional plan view, on line 17—17 in FIG. 1, illustrating parts of the construction of the elevator housing and of the side walls and rear door construction thereof and illustrating the manner in which the containers are conveyed upwardly on the vertical rear run of the vertical elevator conveyor adjacent to the rear door of the vertical elevator housing;

FIG. 18 is an elevational view illustrating the construction of one of the flexible container-conveying and supporting finger members;

FIG. 19 is a fragmentary perspective view illustrating in phantom lines parts of the first and outer feed-in conveyor, and parts of the anti-tilting means and parts of the guide and anti-friction wear strip means for guiding and supporting the endless conveyor in its operation, and illustrating the means for dividing the bank of containers or container bodies as they are fed into the elevator housing;

FIG. 20 is a diagrammatic view illustrating the second and inner feed-in conveyor, the vertical elevator conveyor, and the power means and driving mechanism for the second and inner feed-in conveyor and the power means and driving mechanism for the vertical elevator conveyor;

FIG. 21 is a schematic diagram of the electrical current supply and control circuit for the power means and driving mechanism for the vertical elevator conveyor;

FIG. 21A is a schematic diagram of the electrical current supply and control circuit for the power means and driving mechanism for the inner feed-in conveyor;

FIG. 22 is a fragmentary perspective view illustrating part of the rear door construction of the elevator housing in partially open position, and the hinged mounting of the rear door of the elevator housing, and illustrating the side wall construction of the elevator housing and the reinforcing frame for the rear door construction;

FIG. 23 is a top plan view illustrating the take-away or delivery conveyor means and other parts of the apparatus;

FIG. 24 is a fragmentary view, partly in section and partly in elevation, illustrating the inner feed-in conveyor, the first turning means and parts of the guide means and anti-friction wear strip means for guiding and supporting the endless vertical conveyor as it moves over the first and lower guide and turning plate member;

FIG. 25 is an enlarged sectional view, on line 25—25 in FIG. 24, illustrating the construction of the guide means and anti-friction wear strip means and the means for fastening certain of the sectional parts thereof together;

FIG. 26 is a fragmentary perspective view, partly in section, illustrating the rear door construction of the elevator housing in partially open position and illustrating the hinge mounting means therefor and illustrating part of one of the guide and anti-friction wear strip members attached to the rear door construction on the inner side thereof;

FIG. 27 is an exploded front elevational view illustrating the sectional component parts of the three sets of guide and anti-friction wear strip members for guiding the vertical elevator conveyor during its operation;

FIG. 28 is an exploded perspective view illustrating the construction of the center or middle one of the three sets of guide strips and anti-friction members for guiding the vertical elevator conveyor;

FIG. 29 is a sectional view on line 29—29 in FIG. 19 illustrating the arrangement of the bridge or transfer plate member which transfers the containers from the outer feed-in conveyor to the inner feed-in conveyor; and FIG 30 is a sectional plan view, on line 30—30 in FIG. 6, illustrating the manner in which certain of the guide and anti-friction members are attached to the rear wall of the elevator housing on the inner surface thereof.

DETAILED DESCRIPTION OF THE INVENTION ILLUSTRATED IN THE DRAWINGS

IN GENERAL

A preferred and best mode embodiment of the new container-conveying and elevating apparatus is illustated in the drawings, wherein it is generally indicated at 35, and utilizes a generally horizontal outer feed-in conveyor, which is generally indicated at 36, and which is of conventional design and may be supplied and adapted by the user of the present invention to his particular needs; only part of the outer feed-in conveyor 36 being illustrated in the drawings. Containers or container bodies, such as aluminum or like metal can cup bodies 37, or other containers or container bodies, are conveyed in banks or en masse, that is, in multiple rows, from the outer feed-in conveyor 36 over a transfer or bridge plate member 44 to an inner feed-in conveyor 45 by which the containers 37 are conveyed onto an endless generally vertically extending elevator conveyor, which is generally indicated at 38, and which is arranged in an upright or generally vertically extending elevator housing 39 (FIGS. 1, 2, 3, 17 and 20). The containers or container bodies, such as can cup bodies 37, are elevated by the upright or vertical conveyor 38 from a lower and relatively large area or section 40 to an upper and relatively smaller area or section 41 of the upright and generally vertically extending elevator housing 39 (FIG. 6) where the can cup bodies or other containers 37 are discharged onto a take-away or delivery conveyor 42 which is of generally conventional design, and only part of which is illustrated in the drawings, and by which the containers 37 are conveyed in banks or en masse, that is, in multiple rows, and in upright position, to a work station at which further work may be done on the containers, such as the can cup bodies 37, which may be extruded or otherwise processed into complete can bodies for use in the food canning or other canning industries. As the containers 37 are conveyed along the upper run 97 of the inner feed-in conveyor 45 (FIGS. 6 and 13) they are picked up by the downward and front run 46-47 of the vertical elevator conveyor 38 which cooperates with turning means, which will be described hereinafter, and by which the containers or can cup bodies 37 are successively turned from an upright position through two arcs of ninety degrees (90°) and are elevated by the endless conveyor 38 up to and discharged in upright position, en masse, or in banks, that is, in multiple rows, onto the take-away or delivery conveyor 42 by which they are conveyed in upright position to a work station for extrusion of the can cup bodies 37 into complete can bodies or for other operations on the containers or container bodies.

As shown in FIGS. 6, 7, 13, 20 and 24 of the drawings, the second and inner feed-in or supply conveyor 45 is in the form of an endless conveyor belt which is mounted on horizontally spaced driving and driven rollers 48 and 49, respectively, which are rotatably journaled in the lower area or section 40 of the vertical elevator housing 39.

THE UPRIGHT OR VERTICAL ELEVATOR CONVEYOR HOUSING 39 (FIGS. 1, 2, 3, 4, 5, 6, 7, 10, 11, 13, 16, 17, 23 AND 26)

The upright or vertical elevator housing 39 for the vertical elevator conveyor 38 includes a supporting frame 50 which includes a supporting base 51 above which is the relatively large lower housing section 40. The elevator housing 39 also includes the upright housing section 41 which is arranged above and is substantially smaller or narrower in cross sectional form than the lower and relatively larger housing section 40, and includes spaced parallel side walls 52 having inwardly turned flanges 53, respectively; an open front 54 (FIGS. 1, 2 and 17); a rear wall 173; and a hinged rear door construction which is generally indicated at 55-117 (FIGS. 4, 17, 22 and 26), which will be described in detail hereinafter.

The relatively larger lower housing section 40 of the vertical elevator housing 39 includes spaced parallel upright side walls 56 and a downwardly sloping upper front wall 57 at the bottom of which an access opening 58 is provided (FIG. 6) which is normally closed by a closure member or door 59, which is hingedly connected to the lower end portion of the downwardly sloping front wall 57 by a hinge 60; a handle member 61 being attached to the closure member or door 59.

THE VERTICAL ELEVATOR CONVEYOR 38
(FIGS. 1, 2, 3, 4, 6, 7, 9, 10, 11, 12, 13, 14, 15, 16, 17, 18, 19 AND 20)

The vertical elevator conveyor 38 has a tortuous shape or form (FIGS. 6 and 20) and includes the bottom and generally horizontal run 47, a rear run 62 which includes a vertically extending lower section 63; an arcuate upper section 64; a top horizontal run 65; and a downward front run 66 which includes a vertically extending upper section 67 and a generally horizontally extending lower or bottom run or section 68 (FIGS. 1, 2, 3, 6, 12, 13 and 20).

The vertical elevator conveyor 38 includes an endless conveyor body 69 which is preferably formed of a suitable plastic resinous material, such as polyethylene, or the like, or of metal such as steel, and is composed of a series of flights or articulated sections 70 which are hingedly articulated together by means of hinges or pivotal connections 71 (FIGS. 14 and 15).

Each of the conveyor flights or sections 70 in the body 69 of the vertical elevator conveyor 38 has a multiplicity of spaced generally oval-shaped mounting slots 72 formed therein and which are arranged in longitudinally extending and transversely extending rows (FIGS. 14 and 15), and flexible conveying and supporting finger members 73 are mounted in certain of these mounting slots 72 (FIGS. 14 and 15) in selected patterns for engagement with and for conveying and supporting containers or container bodies of varying sizes and diameters, as will be discussed more fully hereinafter. The flexible container-conveying and supporting finger members 73 may be formed of any suitable flexible, elastic material, such as urethane or other synthetic copolymer elastomeric material, or the like, and each of them includes a generally cylindrical flexible body member 74 having formed integrally thereon a generally conical-shaped upper mounting base flange member 75 and a lower and generally cylindrical lower mounting base flange member 76 (FIGS. 15 and 18).

The flexible conveying and supporting finger members 73 may be removably mounted in position of use on the articulated flights or sections 70 of the body 69 of the vertical elevator conveyor 38 by manually bending the flexible body members 74 thereof and the spaced integral base mounting flanges 75 and 76 thereon and inserting the flexible body 74 through one of the mounting slots 72 with the base mounting flanges 75 and 76 arranged on opposite sides of the body 69 of the conveyor flights or sections 70 and over the upper and lower surfaces thereof, respectively (FIGS. 15 and 18).

THE POWER MEANS AND DRIVING MECHANISMS FOR THE INNER FEED-IN CONVEYOR 42 AND FOR THE VERTICAL ELEVATOR CONVEYOR 38 (FIGS. 2, 3 5, 6, 11, 13, 16, 17, 20, 21 AND 21A)

The power means, power-transmitting or driving mechanisms for the inner feed-in conveyor 45 and for the vertical elevator conveyor 38 are shown in FIGS. 2, 3, 5, 6, 11, 13, 16, 17, 20, 21 and 21A.

Thus, as shown in FIGS. 6, 13 and 20, the inner feed-in conveyor 45 is driven by the drive roller 48 and over the driven guide roller 49 which is mounted on a shaft 77 which is suitably journaled in the lower area 40 of the elevator housing 38. The drive roller 48 is mounted on a driving shaft 78 which is also suitably journaled in the lowr area or section 40 of the elevator housing 38.

The driving shaft 78 is operatively connected to a speed-reducing gear mechanism 79 which is driven by a variable speed electric motor 80 (FIGS. 20 and 21A).

As shown in FIGS. 6, 17 and 20, the lower end portion of the downward front run 66–67 of the vertical elevator conveyor 38 is guided over guide rollers 81 which are mounted on a supporting shaft 82 which is suitably journaled in the lower section 40 of the vertical elevator housing 39, and the generally horizontal bottom section 68 of the downward front run 66–67 of the vertical elevator conveyor 38 is guided over sprockets 83 which are mounted on a shaft 84 having outer end portions which are journaled in bearings 165 which are mounted on the side walls 52 of the elevator housing 39 (FIG. 7). The generally horizontally extending lower or bottom section or run 68 and the lower section 63 of the vertical rear run 62 of the endless elevator conveyor 38 are guided over guide rollers 85 which are mounted on a shaft 86 which is suitably journaled in the lower section 40 of the elevator housing 39.

The vertical elevator conveyor 38 is driven by sprockets 87 which are mounted on a drive shaft 88 which is suitably journaled in the upper section 41 of the elevator housing 39, and the sprockets 87 are driven by a variable speed electric motor 89 which is operatively connected to a speed-reducing gear mechanism 90 which, in turn, is operatively connected to the drive shaft 88 (FIG. 20).

The horizontal top run 65 and the upper section 66 of the front and downward run 67 of the vertical elevator conveyor 38 are guided over sprockets 91 which are mounted on a shaft 92 which is suitably journaled in the upper section 41 of the elevator housing 39.

The operating and control circuit for the variable speed electric driving motor 80 for the inner feed-in conveyor unit 45 is shown in FIG. 21A and is shown as being arranged in a current supply and control circuit 93 which embodies a suitable manually operable electrical switch control unit 94. Similarly, the operating and control circuit for the variable speed electric driving motor 89 for the vertical elevator conveyor 38 is shown in FIG. 21 and includes the electric driving motor 89 which is shown as being arranged in an electrical current supply and control circuit 95 which is controlled by a manually operable control switch unit 96.

The variable speed driving motors 80 and 89 may be of suitable horsepower and speed and other characteristics, and operable on 220 volt circuits, depending upon the heighth of the vertical elevator conveyor 38 and other factors. Likewise, the two driving motors 80 and 89 may be operated at different speeds since, in some instances, it may be desirable to operate the vertical elevator conveyor 38 at a higher rate of speed than the speed of the inner feed-in conveyor 45 so that the containers 37 will be discharged from the vertical elevator conveyor 38 onto the take-away conveyor 42 at a faster rate than they are fed onto the vertical elevator conveyor 38 by the inner feed-in conveyor 45.

THE MEANS (FIGS. 6, 8 AND 13) FOR PREVENTING TILTING OR TIPPING AND JAMMING OF THE CONTAINERS 37 AS THEY ARE ENGAGED BY THE FLEXIBLE CONVEYING AND SUPPORTING FINGER MEMBERS 73 ON THE HORIZONTAL BOTTOM RUN OF THE ELEVATOR CONVEYOR 38 (FIGS. 6, 8, 13 AND 24)

The present invention includes novel anti-tilting means for preventing tilting or tipping and jamming of the containers or container bodies 37 as they are engaged by the flexible container-conveying and supporting finger members 73 on the bottom and generally horizontal lower run 47 of the elevator conveyor 38 and are conveyed off the upper run 97 of the inner feed-in conveyor 45 (FIGS. 6 and 13).

This anti-tilting means is shown in FIGS. 6, 8, 13 and 24 of the drawings, wherein it is generally indicated at 98, and includes a generally rectangular horizontally extending anti-tilting plate member 99 which is mounted on and has its outer marginal edge portions attached, at at 141, to the horizontally extending arm 144 of a supporting angle iron member 101 which is mounted on the lower section 40 of the elevator housing 39 above the inner feed-in conveyor 45-97 (FIG. 24) and is attached, in any suitable manner, as by welding, or by suitable fastening members, to the flanges 53 of the side walls 52 of the elevator housing 39 (FIG. 8).

The anti-tilting plate member 99 includes an inner edge portion 102 which has a row of spaced parallel horizontally extending slots 103 formed therein (FIGS. 6, 8 and 13) and through which the flexible container-conveying and supporting finger members 73 travel as they complete the downward front run 47 of the endless elevator conveyor 38. During this operation the flexible finger members 73 enter into the interior of the containers or container bodies 37 and hold them in upright position and against tilting or tipping and jamming as the containers or container bodies are moved along the upper run 97 of the inner feed-in conveyor 45 and onto and up an arcuately curved guide plate and turning member 104, which will be described hereinafter, and thence up the vertical rear run 63-62 of the flexible endless conveyor 38 (FIGS. 6 and 13). In this manner, the containers or container bodies 37 are prevented from tilting or tipping as they are engaged by the flexible finger members 73 on the conveyor 38 which might cause jamming of the containers or container bodies 37 at this point.

THE FIRST CONTAINER TURNING MEANS FOR TURNING THE CONTAINERS 37 THROUGH AN ARC OF APPROXIMATELY NINETY DEGREES (90°) FROM UPRIGHT POSITION INTO HORIZONTAL POSITION AS THEY ARE REMOVED FROM THE INNER FEED-IN CONVEYOR 45 AND ARE PICKED UP BY THE LOWER BOTTOM AND GENERALLY HORIZONTAL RUN 47 OF THE VERTICAL ELEVATOR CONVEYOR 38 AND ARE CARRIED THEREBY UP THE VERTICAL REAR RUN 63-62 OF THE ELEVATOR CONVEYOR (FIGS. 6, 10, 13, 20 AND 24)

The present invention embodies a first turning means for turning the containers or container bodies 37 through an arc of approximately ninety degrees (90°) from upright position into a horizontal position as they are fed into the elevator housing 39 and are removed from the upper run 97 of the inner feed-in conveyor unit 45 and are picked up by the bottom and generally horizontal run 47 of the vertical elevator conveyor 38 and are elevated by the rear run 63-62-64 of the elevator conveyor 38 up toward and discharged onto the take-away or delivery conveyor 42.

As shown in FIGS. 6, 13, 19, 20 and 24, this first turning means includes the first and lower arcuately shaped guide plate and turning member 104 which extends between the side walls 56 of the lower section 40 of the elevator housing 39 and extends arcuately upwardly from its lower and generally horizontal end portion, adjacent to the inner feed-in conveyor 45, to its vertically extending upper edge portion 105 adjacent the lower end of the rear door construction 55 of the vertical elevator housing 39. The arcuate shaped lower guide plate and turning member 104 has an outwardly extending flange portion 164 at its upper end which is supported in position of use on a supporting member 107 in the elevator housing 30 which extends horizontally across and is attached to the side walls 52 thereof (FIGS. 6, 10 and 13).

The lower and arcuate-shaped turning plate member 104 is further supported between its upper and lower ends on a supporting member 158 which extends transversely and horizontally across the elevator housing 38 and has flanged outer end portions 159 which are attached, as at 160, to the side walls 52 of the elevator housing 38 (FIGS. 6 and 10).

As shown in FIGS. 6 and 13, the first container-turning means includes part of the generally horizontal bottom run 47 and the lower part 63 of the generally vertical rear run 62 of the elevator conveyor 38 working in conjunction with the arcuately shaped guide plate and turning plate member 104 and the flexible finger members 73 on the endless elevator conveyor 38.

As will be described more fully hereinafter, in the use of the present invention, the first turning means, including the arcuate-shaped guide plate and turning member 104, in cooperation with the lower part of the bottom generally horizontally run 47 and the lower part 63 of the generally vertical rear run 62 of the elevator conveyor 38, causes the containers or container bodies 37 to be turned through an arc of approximately ninety degrees (90°) from upright position into a horizontal position as they are conveyed along the upper run 97 of the inner feed-in conveyor 45 and are picked up by the flexible container conveying and supporting finger members 73 on the bottom and generally horizontal run 47 of the elevator conveyor 38 by which they are carried over and around the upper surface of the arcuate-shaped guide plate and turning member 104 and are turned thereby and are thence carried in a generally horizontal position up the vertical rear run 63-62 of the elevator conveyor 38 toward and discharged onto the take-away or delivery conveyor 42.

THE SECOND TURNING MEANS FOR TURNING THE CONTAINERS 37 THROUGH A SECOND ARC OF APPROXIMATELY NINETY DEGREES (90°) FROM A HORIZONTAL POSITION INTO UPRIGHT POSITION AS THEY ARE DISCHARGED FROM THE UPPER SECTION 64 OF THE REAR RUN OF THE VERTICAL ELEVATOR CONVEYOR 38 ONTO THE UPPER RUN OF THE TAKE-AWAY OR DELIVERY CONVEYOR 42 (FIGS. 6, 11, 12 AND 20)

The present invention includes a second turning means for turning the containers or container bodies 37 through a second arc of approximately ninety degrees (90°) from the horizontal position in which they are elevated by the vertical rear run 63–62 of the vertical elevator conveyor 38 up toward the take-away or delivery conveyor 42. This second turning means is illustrated in FIGS. 6, 11, 12 and 20 of the drawings, wherein it is generally indicated at 108, and includes an arcuate-shaped guide plate and turning member 109 which has an outwardly extending flange portion 181 at its uupper end and is mounted, as at 110 and 111 on, and extends between, the side walls 54 of the upper section 41 of the vertical elevator housing 39 and below the arcuately curved upper section 64 of the rear run 62–63 of the endless conveyor 38.

As shown in FIGS. 6 and 12, the arucate-shaped guide plate and turning member 109 is curved upwardly and rearwardly from its lower and generally vertically extending end portion to a point immediately adjacent to and inwardly of the upper run of the take-away or delivery conveyor means 42 as it travels over the sprockets 179.

As shown in FIGS. 6 and 11, the second and upper turning plate member 109 is supported by supporting members 110, 111 and 161 which extend transversely and horizontally across the elevator housing and are attached to the side walls thereof. Thus, as shown in FIG. 11, the supporting member 161, which is typical of this group of supporting members 110–111 and 161, has flanged outer end portions 162 which are attached to the side walls 52 of the elevator housing, as at 163.

Thus, the second turning means 108 includes the arcuate-shaped guide plate and turning member 109 and the arcuately curved section 64 of the rear run 62–63 of the vertical elevator conveyor 38, and the flexible finger members 73 carried thereby, and the mutual cooperation of these parts.

In the use of the new container-conveying and elevating apparatus 35 the second turning means 108 causes the containers or container bodies 37 to be turned gradually through an arc of approximately ninety degrees (90°) from the horizontal position in which they are held as they are carried up the rear run 63–62–64 of the vertical elevator conveyor by the flexible container-conveying and supporting finger members 73, and over the upper surface of the arcuate guide plate and turning member 109, so that as the containers or container bodies 37 reach the upper run of the take-away or delivery conveyor 42 they are discharged onto the upper run of the take-away conveyor 42 and are conveyed in upright position to a work station such, for example, in the case of the aluminum can bodies 37, to a work station where they are extruded into complete can bodies, or for other operations.

During this operation, as shown in FIG. 12, preferably at least one of the flexible finger members 73 enters into the interior of each of the containers or container bodies as they are moved over the arcuate-shaped guide plate and turning member 109.

THE DELIVERY OR TAKE-AWAY CONVEYOR 42 (FIGS. 1, 3, 5, 6, 12 AND 23)

As shown in FIGS. 1, 3, 5, 6, 12 and 23 of the drawings, the delivery or take-away conveyor is generally indicated at 42 and is generally conventional in form, and may be operated by any suitable electrical power means and driving mechanism therefor. The take-away or delivery conveyor 42 is guided over sprockets 179 which are mounted on a supporting shaft 180 which is suitably journaled in the side walls of the upper 41 of the elevator housing (FIGS. 6 and 12).

THE MEANS FOR REMOVING ERRANT OR STRAY CONTAINERS 37 FROM THE DOWNWARD AND FRONT RUN 67–66 OF THE ELEVATOR CONVEYOR 38 (FIGS. 1, 2, 3, 6, 9 AND 23)

It may happen occasionally in the use of the new container-conveying and elevating apparatus 35 that one or more errant or stray containers or container bodies 37 will not be discharged from the arcuately curved upper section 64 of the rear run 62–63 of the flexible endless elevator conveyor 38 as the containers or container bodies 37 are moved thereby over the upper surface of the arcuate-shaped upper guide and turning plate member 109 to be discharged onto the upper run of the take-away or delivery conveyor 42 (FIGS. 6 and 12). In such an event, the errant or stray containers or container bodies 37 might be conveyed by one or more of the flexible finger members 73 up over the top horizontal run 65 and downwardly on the front and downward run 67–66 of the endless conveyor 38 and cause jamming of, and damage to, the moving and other parts of the apparatus 35 and particularly within the lower section 40 of the elevator housing 39.

To eliminate this possibility the present invention provides means for removing such errant or stray containers or container bodies 37 from the front and downward run 67–66 of the flexible endless conveyor 38 just prior to the time it enters the lower section 40 of the vertical elevator housing 39. This means is illustrated in FIGS. 1, 2, 3, 6, 9 and 23, wherein it is generally indicated at 112, and includes a generally rectangular-shaped plate member 113 which is mounted on and is attached, as at 114, to the upper surface of the downwardly inclined top wall 57 of the lower section 40 of the vertical elevator housing 39 (FIGS. 1, 2, 3, 6 and 9). The plate member 113 includes an upper edge portion 115 which has a series or row of spaced parallel slots 116 formed therein which are open at their upper ends for the reception and passage therethrough of the flexible finger members 73 on the body 69 of the elevator conveyor 38.

In the use of the present invention, if one or more errant or stray containers or container bodies 37 should not be discharged from the arcuately curved upper section 64 of the rear run 62–63 of the elevator conveyor 38 (FIGS. 6 and 12) and be carried along the top horizontal run 65 of the flexible endless conveyor 38 and down the front and downward run 67–66 thereof, such an errant or stray container or containers 37 will be carried downwardly by the flexible finger members 73 on the front and downward run 67-66 of the flexible endless conveyor 38, at the open front 54 of the elevator housing 39, and will be discharged therefrom by the action of the flexible finger members 73 entering into and passing through the slots 116 in the plate member 113, thereby removing the errant or stray container or containers 37 from the flexible finger member or members 73, by which they are held, and discharging them therefrom onto the downwardly inclined top wall 57 of the lower section 40 of the elevator housing 39 from which they may be removed in any suitable manner. In this manner, such errant or stray container or containers 37 are prevented from being carried down into the lower section 40 of the elevator housing 39 where they might cause jamming and serious damage to the working and other parts of the apparatus.

THE REAR DOOR CONSTRUCTION 55-117 OF THE VERTICAL ELEVATOR HOUSING 39 (FIGS. 4, 6, 17, 22 AND 26)

The vertical elevator housing 39 has an opening in the lower section of the rear wall 173 thereof which is normally closed by a rear door construction which is illustrated in FIGS. 4, 6, 17, 22 and 26 of the drawings, wherein it is generally indicated at 55, and in the preferred form of the invention illustrated in the drawings includes a lower hinged door member 117 which will be described hereinafter. However, if desired an additional opening may be formed in the upper section of the rear wall 173 of the elevator housing 39 and normally closed by an upper hinged door member 118 and, as shown in FIG. 4, the rear wall 173 of the elevator housing 39 may be provided with reinforcing members, as 119, and the rear door members 117 and 118 may be provided with similar reinforcing members, as 172 (FIG. 4).

The number of hinged rear door members 117 and 118 depends upon and may be varied in accordance with the vertical height of the elevator housing 39 and of the vertical elevator conveyor 38 disposed therein and the needs of the user of the invention.

As shown in FIGS. 22 and 26 of the drawings, the rear door member 117 is hingedly mounted, at both ends, on hinge units 120, one hinge leaf 121 of each hinge unit 120 being attached, as at 122, to the rear door member 117, and the other hinge leaf 123 being attached, as at 124, to one of the channel-shaped portions 53 of one of the side walls 52 of the vertical elevator housing 39 (FIG. 22). Each of the hinge units 120 includes a hinge knuckle construction 125 having the shank of a hinge pin 126 extending therethrough (FIG. 22), and the upper rear door member 118 may be similarly mounted. The hinge pin 126 has a laterally extending handle portion 182 integrally attached thereto to facilitate insertion and removal thereof (FIG. 22).

As shown in FIGS. 22 and 26 the rear door member 55-117 embody a peripheral reinforcing and strengthening frame 127 which is secured to the body of the rear door member 55-117 in any suitable manner.

In the use of the present invention, each of the rear door members 117 and 118 may be unhinged at either end thereof by withdrawing the hinge pins 126 from the hinge knuckles 125 and pivoting the rear door members 117 or 118 into open position, as in FIG. 26, for the purpose of inspection or replacement or repair of parts of the vertical elevator conveyor 38 or for correction of possible jamming of the containers or container bodies 37, thereof, or for other purposes.

It has also been found that it is advantageous to have the rear door members 117 and 118 hingedly mounted at both ends since this enables the rear door members 117 and 118 to be opened from either side thereof and enables access to be had to the interior of the elevator housing 39 in areas where space and accessability to the interior of the elevator housing 39 and to the elevator conveyor 38 are important factors.

THE CONSTRUCTION AND MOUNTING OF THE GUIDE AND ANTI-FRICTION WEAR STRIP MEANS FOR GUIDING AND SUPPORTING THE ENDLESS CONVEYOR 38 AND FOR MAINTAINING THE FLEXIBLE FINGER MEMBERS 73 OUT OF ENGAGEMENT WITH THE ADJACENT SURFACES OVER WHICH THE ENDLESS CONVEYOR 38 TRAVELS IN ITS OPERATION (FIGS. 6, 10, 11, 12, 19, 24, 25, 27, 28 AND 30)

The present invention provides guiding and anti-friction wear strip means for guiding and supporting the endless elevator conveyor 38 as it travels through its cycle of operations in the elevator housing 39 and for maintaining the flexible finger members 73 out of contact with the adjacent surfaces over and adjacent to which the endless elevator conveyor 38 travels during its operation.

This guiding and anti-friction wear means is illustrated in FIGS. 6, 10, 11, 12, 19, 24, 25, 27, 28 and 30 of the drawings, wherein it is generally indicated at 128, and includes a plurality, shown as three, groups of generally vertically extending and generally parallel sectional guide and anti-friction wear strip units, namely, a center or middle group 129, and two side groups of guide and anti-friction wear strip units 130 and 131 (FIGS. 6, 10, 11, 24, 27, 29 and 30). The center or middle group 129 of guide and anti-friction wear strip members includes a first and lowermost and generally horizontal guide and anti-friction wear strip member 132; a second and curved guide and anti-friction wear strip member 133; another guide and anti-friction wear strip member 134; a guide and anti-friction wear strip member 135; and an uppermost curved guide and anti-friction wear strip member 136 (FIGS. 27, 28 and 30). The guide and wear strip member 136 has a notched portion 183 in the bottom surface thereof to provide clearance for the take-away conveyor 42 and the guide and wear strip members 136a and 136b have similar notched portions 183a and 183b, respectively, in the bottom surfaces thereof for the same purpose (FIGS. 6, 12, 27 and 28).

The component parts of the two outer side guide and anti-friction wear strip units 130 and 131 have the same general construction as the component parts of the middle or center guide and anti-friction wear strip unit 129 and hence those parts thereof which correspond to parts in the middle or center group of guide and anti-friction wear strip unit 129 have been given the same reference numerals followed by the additional and distinguishing reference characters "a" and "b", respectively (FIGS. 27 and 38).

The guide and anti-friction wear strip units 129, 130 and 131 are preferably formed of ultra high molecular weight polyethylene which has inherent or built-in lubricating characteristics.

It will be noted that the lowermost guide and wear strip members 133, 133a and 133b have an arcuate shape which corresponds generally to the arcuate curvature of the first and lower turning plate member 104, and that the upper arcuate-shaped guide and wear strip members 136, 136a and 136b have an arcuate shape which corresponds generally to the arcuate shape or curvature of the second and upper turning plate member 109 so that the arcuate-shaped guide and wear strip members 133, 133a and 133b and 136, 136a and 136b guide the endless conveyor 38 as it moves over or around the turning plate members 104 and 109, respectively.

The means for fastening together certain of the component parts or sections of the combination guide and anti-friction wear strip units 129, 130 and 131 (FIGS. 27 and 28) is illustrated in FIG. 25, wherein it is generally indicated at 137, and is shown as applied to the two stationary component parts or sections 132 and 133 of the center or middle guide strip and anti-friction wear strip unit 129, although the same fastening means is employed for fastening together certain of the stationary component parts 132a–133a and 132b–133b of the outer guide and anti-friction wear strip units 130 and 131.

Thus, as shown in FIG. 25 the guide and anti-friction wear strip member 132 has a tongue portion 138 formed on one end portion thereof and this tongue portion 138 fits into a correspondingly shaped groove 139 in the guide and anti-friction wear strip member 133 wherein it is fastened by a fastening element in the form of a headed screw 140; the head of the screw 140 being flush with the outer surface of the guide and anti-friction wear strip member 133 so as not to interfere with the operation of the movement of the endless conveyor belt 38. In this manner a mortise and tenon fastening joint 137 is formed between the parts.

The manner of fastening the stationary component parts 132–133, 132a–133a and 132b–133b in position of use is as follows:

As shown in FIG. 8, the lowermost and generally horizontally extending guide and wear strip members 132, 132a and 132b, are fasened, by suitable fastening elements 141, 142 and 143, respectively, to the horizontally extending arm 144 of the angle iron member 101 which extends horizontally across the front of the lower area or section 40 of the elevator housing 38 above the anti-tilting plate member 99; the fastening elements 141, 142 and 143 extending through openings in the front or outer edge portion of the anti-tilting plate member 99 and into threaded openings, as 148, (FIG. 28), in the lowermost horizontally extending guide and wear strip members 132, 132a and 132b (FIGS. 6 and 8).

The lower arcuate-shaped guide and wear strip members 133, 133a and 133b are fastened to the correspondingly shaped lower arcuate-shaped turning plate member 104 by fastening elements in the form of screws 145, 146 and 147, respectively, as shown in FIG. 10 of the drawings; the fastening elements or screws 145, 146 and 147 being inserted into threaded openings, as 149, in the lower arcuately-curved guide and wear strip members 133, 133a and 133b (FIG. 28).

It will be noted (FIGS. 27 and 28) that the vertically extending guide and wear strip members 134, 134a and 134b in the guide and anti-friction wear strip units 129, 130 and 131, respectively, are not joined together by tongue and groove or mortise and tenon joints.

This is for the reason that the intermediate and vertically extending guide and wear strip members 134, 134a and 134b of the guide and anti-friction wear strip units 129, 130 and 131, respectively, are fastened to the inner surface of the rear door construction, as 55–117, by means of fastening elements in the form of screws 153, 154 and 155, respectively (FIG. 17), which are inserted through the wall of the rear door construction, as 55–117, (FIG. 17), into threaded openings, as 156, in the members 134, 134a and 134b, respectively.

It will be noted, in this connection, that the vertically extending upper guide and anti-friction wear strip members 135, 135a and 135b are fastened to the inner surface of the rear wall 173 of the elevator housing 39 by fastening means in the form of screws 174 which are inserted through openings 157 (FIG. 28) in the members 135, 135a and 135b into the rear wall 173 of the housing 39 (FIG. 30).

The uppermost guide and anti-friction wear strip members 136, 136a and 136b (FIGS. 27 and 28) are mounted in position by being attached to the upper guide and turning plate member 109 by means of fastening elements in the form of screws 175, 176 and 177, respectively, which are inserted through openings, as 178, in the guide and wear strip members 136, 136a and 136b (FIG. 28), as shown in FIG. 11 of the drawings.

In addition, the lower section 63 of the endless elevator conveyor 38 is guided, in part, by a vertically extending guide plate member 184 which is supported by angle iron supporting members 185 which extend transversely across the housing 39 (FIGS. 6 and 30).

THE CONTAINER TRANSFER OR BRIDGE PLATE MEMBER (FIGS. 1, 6, 16, 19, 20 AND 29)

The present invention includes means for transferring the containers or container bodies 37 from the upper run of the outer feed-in conveyor 36 to the upper run of the inner feed-in conveyor 45–97. This means is shown in FIGS. 1, 6, 16, 19, 20 and 29, and consists of a container transfer or bridge member 44 which extends horizontally and transversely across the inner end portion of the upper run of the outer feed-in conveyor 36, and in coplanar relationship therewith, and has outer end portions 166 which are attached, by suitable fastening elements 167, to supporting members 168 which are attached to the side walls 52 of the elevator housing 39 (FIGS. 16 and 19).

In use, the containers 37 are fed from the upper run of the outer feed-in conveyor 36 onto the bridge or transfer member 44 and are pushed thereover, by the succeeding or following containers 37, onto the upper run 97 of the inner feed-in conveyor 45.

In the use of the present invention the endless elevator conveyor 38 travels over the guide and wear strip units 129, 130 and 131 and the body 69 of the elevator conveyor 38 bears against and is supported by the guide and anti-friction wear strip units 129, 130 and 131. During this operation the flexible container-conveying and supporting fingers 73 are maintained out of contact or engagement with the adjacent surfaces, such as the arcuate-shaped lower and upper guide plate and turning members 104 and 109, respectively, and the inner surface of the rear door construction, as 55–117, over or adjacent to which the endless conveyor 38 travels in use (FIGS. 6, 10, 11 and 12).

It will be noted, in this connection, that an area 169 is provided in the longitudinal center of the body 69 of the endless elevator conveyor 38 in which there are no flexible finger members (FIGS. 9 and 17) and similar areas 170 and 171 are provided at the outer marginal edge portions of the body 69 of the endless conveyor 38 in which there are no flexible finger members 73 so that the body 69 of the endless conveyor 38 may bear upon the guide and anti-friction wear strip units 129, 130 and 131, respectively, as it travels thereover in use (FIGS. 6, 7, 9, 10, 16 and 17).

As shown in FIG. 19, the lowermost stationary center or middle guide and anti-friction wear strip member 132 and the two lowermost guide and wear strip members 132a and 132b project outwardly or forwardly over the transfer or bridge plate member 165 and divide the bank of containers 37 as they are fed into the elevator housing 39 so that as the containers 37 travel inwardly and upwardly in the elevator housing 39 certain of the containers 37 pass on opposite sides of the longitudinal center area 169 of the body 69 of the endless conveyor 38 in which there are no flexible finger members 73 and certain others of the containers 37 pass inwardly of the outer marginal edge portions of the body 69 of the elevator conveyor 38 on which there are no finger members 73 (FIG. 17). In this manner the containers 37 are conveyed upwardly on the elevator housing 39 by the endless conveyor 38 on opposite sides of and without engaging the center guide and anti-friction wear strip unit 129 and inwardly of the outer marginal edge portions of the body 69 of the elevator conveyor 38 on which there are no finger members 73.

DETAILED DESCRIPTION OF THE OPERATION OF THE CONTAINER CONVEYING AND ELEVATING APPARATUS SHOWN IN THE DRAWINGS

In the use and operation of the present invention the outer feed-in conveyor 36 may be set in operation and the operating and control circuits 93 and 95, for the driving motor 80 for the inner feed-in conveyor 45 and the driving motor 89 for the elevator conveyor 38 may be energized by means of the manually operable control switches, 94 and 96, respectively, whereupon containers or container bodies, such as the can cups 37, deposited upon the outer feed-in conveyor 36 will be delivered onto the horizontally extending bridge or transfer plate member 44 from which they will be advanced in upright position onto the upper run 97 of the inner feed-in conveyor 45.

The containers or container bodies 37 are then conveyed inwardly along the upper run 97 of the inner feed-in conveyor 45 and during this operation the containers 37 pass under the anti-tilting plate member 98-99 and below the slots 103 therein (FIGS. 6 and 13). As the containers 37 pass under the slots 103 in the anti-tilting plate member 98-99 the flexible finger members 73 on the bottom run 47 of the endless conveyor 38 enter into and pass through the slots 103 and project downwardly into the interior of the containers 37 as the containers 37 are moved along the upper run 97 of the inner feed-in conveyor 45. This action keeps the containers 37 in upright position and prevents them from being tilted or tipped as they move along the upper run 97 of the inner feed-in conveyor 45, since such tilting or tipping might cause jamming of the containers or container bodies 37 during this operation.

The containers 37 are then conveyed onto and upwardly over the inner surface of the lower arcuate guide and turning plate member 104 and during this operation the closed bottom walls of the containers 37 engage the inner surface of the turning plate member 104 and the containers 37 are turned through an arc of approximately ninety degrees (90°) from upright position into a horizontal position in which the containers 37 are carried up the vertical rear run 63-62 of the endless conveyor 38.

Accordingly, as the containers 37 are thus conveyed upwardly through the vertical elevator housing 39, by the vertical rear run 63-62-64 of the elevator conveyor 38, the closed bottom walls of the containers 37 engage and ride over the inner and upper surface of the upper arcuate guide and turning plate member 109 (FIGS. 6 and 12). During this operation the containers 37 are again turned through an arc of approximately ninety degrees (90°) from a horizontal position into upright position as they are conveyed off the upper surface of the arcuate guide and turning plate member 109 and onto the upper run of the take-away or delivery conveyor 42, as shown in FIGS. 6 and 12.

The endless conveyor 38 then travels around the sprockets 87, as shown in the upper right hand corner of FIG. 6, and in FIG. 11, and thence along the horizontal upper run 65 thereof, over the sprockets 91, as shown at the upper left in FIG. 6, and thence downwardly along the front and downward run 67-66 of the endless conveyor 38.

During this operation the body 69 of the endless conveyor 38 is guided by and rides over the guide and anti-friction wear strip units 129-130-131 and this action maintains the flexible finger members 73 out of contact with and from engaging the adjacent surfaces over or adjacent to which the body 69 of the conveyor 38 travels during its operation (FIGS. 6, 10, 11 and 12).

It will be noted that the mounting of the guide and anti-friction wear strip members 135, 135a and 135b, on the inner surface of the rear door, as 55-117, allows the rear door to be moved into open position when necessary, but that when the rear door is closed the guide and wear strip members 135, 135a and 135b move into their proper cooperating positions in alignment in the three rows of guide and wear strip units 129, 130 and 131.

In the event that one or more errant or stray containers 37 should not be discharged from the endless conveyor 38 onto the take-away or delivery conveyor 42, and should they be carried along the upper horizontal run 65 of the endless conveyor 38 and then downwardly along the front and downward run 67-65 thereof, the flexible conveying and supporting finger members 73 which are carrying or supporting such an errant or stray container or containers 37, will enter into and pass through the slots 116 in the plate member 113, as shown in FIGS. 6 and 9. During this operation any errant or stray containers 37 which are thus being carried by the finger members 73 on the front and downward run 67-66 of the endless conveyor 38 will be dislodged therefrom onto the plate member 113 from which they will roll by gravity down the inclined front wall 57 of the lower section 40 of the elevator housing 39 from which they may be removed and replaced on the outer feed-in conveyor 36.

In this manner any errant or stray containers 37 will be prevented from being carried down into the lower section 40 of the vertical elevator housing 39 where they might cause jamming of and damage to the working and other parts of the apparatus.

THE VARIOUS PATTERNS OR ARRANGEMENTS IN WHICH THE FLEXIBLE FINGER MEMBERS 73 MAY ENGAGE AND CONVEY THE CONTAINERS OR CONTAINER BODIES 37 DURING MOVEMENT OF THE ELEVATOR CONVEYOR 38 (FIG. 14)

In the use of the present invention, it may happen that the flexible container-engaging and supporting finger members 73 on the body 69 of the elevator conveyor 38 may not always enter into the interior of one of the containers or container bodies 37 as the containers 37 are moved off the upper run 97 of the inner feed-in conveyor 45 and over the upper surface of the first and lower arcuate-shaped guide and turning plate member 104 and vertically up the rear run 63–62 of the elevator conveyor 38.

Thus, in some instances, and in a preferred pattern, as shown in FIG. 14, the containers or container bodies 37 may be held and supported through the conveying operation by means of a single flexible finger member 73 entering into the interior of the container or container body 37, and two flexible finger members 73 engaging the outer surface of the wall of the container 37, as indicated by the phantom line showing of a container or container body 37 shown at "Pattern A" (Preferred) in FIG. 14; or by only one finger member 73 entering into the interior of the container or container body 37, "Pattern B" (Normal) in FIG. 14; or by two finger members 73 engaging the wall of the container 37 from the outside thereof and no finger member 73 disposed inside the container 37 "Pattern C" (Occasional) in FIG. 14; or by two finger members 73 engaging the wall of the container 37 from the outside thereof and no finger member 73 engaging the container 37 from the inside thereof but in a different pattern from that illustrated in "Pattern C" ("Pattern D"-Rare) in FIG. 14.

The hinged front door 59 in the lower section 40 of the vertical elevator housing 39 may be opened by means of its handle 61, on its hinge mounting 60, to provide access to the interior of the lower section 40 of the elevator housing 39 for repair or replacement of parts, of for other purposes, as desired.

The rear door 55–117 may be opened from either end thereof on its hinge mountings 120 (FIGS. 22 and 26) to provide access to the interior of the elevator housing 39 for repair, replacement or other purposes.

The flexible conveyor engaging and supporting finger members 73 may be readily removed from their mountings in the slots 72 in the body 69 of the endless conveyor 38 for repair or replacement, as desired, and for arrangement of the finger members 73 in any desired pattern for use with can cups or other containers or container bodies of varying sizes and diameters.

It will thus be seen from the foregoing description, considered in conjunction with the accompanying drawings, that the present invention provides a new and improved container-conveying and elevating apparatus having the desirable advantages and characteristics and accomplishing its intended objects including those hereinbefore pointed out and others which are inherent in the invention.

I claim:

1. A conveying and elevating apparatus for conveying and elevating articles from a supply of randemly arranged articles while maintaining their orientation, said apparatus comprising:
   (a) an upwardly extending elevator housing,
   (b) an endless conveyor mounted in said housing for conveying said articles, said endless conveyor having an upwardly extending run, a generally horizontal lower run which curves upwardly at the end thereof to join said upwardly extending run and a return run which extends from the top of the upwardly extending run and which merges with the horizontal lower run at the beginning thereof,
   (c) a plurality of flexible conveying and supporting members mounted on, and distributed transversely and longitudinally of, said endless conveyor and projecting outwardly therefrom on the side thereof which faces downwardly from said horizontal run,
   (d) a bottom support extending below said horizontal run for supporting said articles as they become engaged by the flexible conveying and supporting members at the beginning of said horizontal run,
   (e) a rear support which extends from said bottom support and which curves upwardly to follow said horizontal run and said upwardly extending run,
   (f) anti-tilting means arranged below said horizontal run and extending laterally and horizontally across the run and longitudinally from the entrance thereto to a location beyond the beginning thereof and cooperating therewith and with said bottom support to maintain said randomly arranged articles oriented on said bottom support until said articles become engaged by said flexible conveying and supporting members,
   (g) feed-in means for feeding said articles onto said bottom support, and
   (h) discharge means for discharging said articles from the upper end of said upwardly extending run.

2. A conveying and elevating apparatus according to claim 1 wherein said housing and endless conveyor are constructed such that said upwardly extending run extends vertically.

3. A conveying and elevating apparatus according to claim 1 wherein said bottom support comprises a bottom conveyor having a horizontal surface which moves under the horizontal run of said endless conveyor.

4. A conveying and elevating apparatus according to claim 1 wherein said anti-tilting means comprises a plate mounted to extend under and beyond the beginning of said horizontal run of said endless conveyor and above said bottom support and cooperating with said bottom support to maintain said articles oriented thereon until engagement with said articles is made by said flexible conveying and supporting members.

5. A conveying and elevating apparatus according to claim 4 wherein said plate has slots therein extending in the direction of movement of said endless conveyor, said slots being located in alignment with said flexible conveying and supporting members to permit said members to pass through and extend down into said articles while said plate extends over the upper ends of the articles.

6. A conveying and elevating apparatus according to claim 1 wherein said discharge means comprises means guiding said conveyor at the upper end of said upwardly extending run to curve concavely to return articles conveyed thereby toward their original feed-in orientation and wherein said rear support curves at its upper end to follow the concave curve of said endless conveyor.

7. A conveying and elevating apparatus as defined in claim 1 in which the said endless conveyor includes:
   (a) a body composed of (b) a plurality of conveyor flights hingedly articulated together; and in which each of the said conveyor flights has formed therein (c) a plurality of mounting slots; and in which (d) each of the said flexible container-conveying and supporting members has a mounting base portion which is mounted in a preselected one of the said mounting slots.

8. A conveying and elevating apparatus according to claim 1 wherein errant or stray article removing means are arranged in conjunction with said return run to remove therefrom any articles not discharged from said discharge means.

9. A conveying and elevating apparatus according to claim 8 wherein said errant or stray article removing means comprises a removal plate mounted along said return run of said endless conveyor and having slots therein positioned and oriented to allow said flexible conveying and supporting members to pass through.

10. A conveying and elevating apparatus according to claim 1 wherein said housing includes guiding and anti-friction wear strip means on which said endless conveyor travels, said guiding and anti-friction wear strip means being constructed and arranged to maintain said flexible container conveying and supporting members out of contact with said bottom and rear supports.

11. A conveying and elevating apparatus according to claim 10 wherein said housing includes a rear door opening and a rear door construction hingedly mounted for movement on the housing for movement to open and close said rear door opening, said rear door construction including a portion of said rear support and a portion of said guiding and anti-friction wear strips.

12. A conveying and elevating apparatus according to claim 10 wherein said endless conveyor has wear strip engaging areas extending longitudinally along said conveyor over its entire length, said areas being free of said flexible conveying and supporting members.

13. A conveying and elevating apparatus according to claim 12 wherein one of said areas is located centrally of said endless conveyor and wherein one of said guiding and anti-friction wear strip members extends outwardly of said housing and over said bottom support to divide said articles so that they move along opposite sides of said one area.

14. A conveying and elevating apparatus as defined in claim 1 in which the said endless conveyor includes a body having multiple transversely and longitudinally extending rows of mounting slots; and in which each of the said flexible conveying and supporting members has a mounting base portion which is adapted to be mounted in one of the said mounting slots in the said endless conveyor body; and in which the said mounting base portion of each of the said flexible conveying and supporting members is removably mounted in one of the said mounting slots in the said endless conveyor body so that the said flexible members may be arranged in various patterns on said body of the said endless conveyor and thus enable the said flexible members thereon to be used with articles of varying and different sizes and shapes.

15. A conveying and elevating apparatus as defined in claim 14 in which the said endless conveyor body is composed of (a) a plurality of conveyor flights or sections hingedly articulated together; and in which each of the said conveyor flights or sections has formed therein (b) a plurality of mounting slots; and in which (c) each of the said flexible conveying and supporting members has a mounting base portion which is adapted to be removably mounted in one of the said mounting slots in one of the said conveyor flights or sections.

* * * * *